US012146626B2

(12) United States Patent
Skeren et al.

(10) Patent No.: US 12,146,626 B2
(45) Date of Patent: Nov. 19, 2024

(54) OPTICAL CELLS FOR MODULAR LUMINAIRES

(71) Applicant: IQS GROUP s.r.o., Husinec-Rez (CZ)

(72) Inventors: Marek Skeren, Nova Ves (CZ); Zbynek Ryzi, Littleton, MA (US); Tomas Tethal, Husinec-Rez (CZ); Roman Houha, Prague (CZ)

(73) Assignee: IQS GROUP s.r.o., Husinec-Rez (CZ)

( * ) Notice: Subject to any disclaimer, the term of this patent is extended or adjusted under 35 U.S.C. 154(b) by 0 days.

(21) Appl. No.: 18/044,394

(22) PCT Filed: Sep. 8, 2021

(86) PCT No.: PCT/EP2021/074707
§ 371 (c)(1),
(2) Date: Mar. 8, 2023

(87) PCT Pub. No.: WO2022/053512
PCT Pub. Date: Mar. 17, 2022

(65) Prior Publication Data

US 2023/0341097 A1 Oct. 26, 2023

(30) Foreign Application Priority Data

Sep. 8, 2020 (GB) ..................................... 2014094

(51) Int. Cl.
*F21S 2/00* (2016.01)
*F21V 5/00* (2018.01)
(Continued)

(52) U.S. Cl.
CPC .............. *F21S 2/005* (2013.01); *F21V 5/007* (2013.01); *F21V 7/0083* (2013.01);
(Continued)

(58) Field of Classification Search
CPC ........ F21S 2/005; F21V 5/007; F21V 7/0083; F21V 7/0091; F21V 17/164
See application file for complete search history.

(56) References Cited

U.S. PATENT DOCUMENTS

2005/0286252 A1 12/2005 Hanano
2009/0323334 A1 12/2009 Roberts et al.
(Continued)

FOREIGN PATENT DOCUMENTS

KR 100 944 366 3/2010
WO WO 2013/006239 1/2013
WO WO 2013/142437 9/2013

OTHER PUBLICATIONS

International Searching Authority: International Search Report and Written Opinion, Intl. App. No. PCT/EP2021/074707 (Dec. 21, 2021).

(Continued)

*Primary Examiner* — Gerald J Sufleta, II
(74) *Attorney, Agent, or Firm* — Walters & Wasylyna LLC

(57) ABSTRACT

An optical cell (10) for forming a luminaire, the optical cell (10) comprising: (i) a light collector element (14), (ii) a cover element (15) attached to the light collector element (14), and (iii) a transmission element (16) mounted between the light collector element (14) and the cover element (15); wherein: (iv) the light collector element (14) comprises a body including: an input, e.g. an input opening, for receiving and collecting light from at least one light source, e.g. one or more LEDs (32) pre-mounted on a circuit- or wiring board (30); an output, e.g. an output opening, for propagating collected light towards the transmission element (16); at least one wall (52) defining one or more portions of the body, such as an internal chamber (53) therewithin, between its (Continued)

input and output, and configured for collecting light entering the body/chamber (53) via its input and conveying or directing said light towards its output; and attachment means (55, 65) for mechanically attaching the light collector element (14) to the cover element (15) and securing the transmission element (16) therebetween; (v) the cover element (15) comprises: an input opening facing towards the transmission element (16) and for receiving light transmitted thereby; an output opening via which light is outputted from the optical cell (10); and at least one internal surface (62) defining a cavity (63) within the cover element (15) between its input and output openings, the cavity's internal surface(s) (62) being configured for allowing or effecting passage of light, or a portion of the light, through the cavity (63) from the cover element's input opening towards its output opening; and (vi) the transmission element (16) comprises: one or more planar optical elements, wherein the or each optical element includes a first surface facing towards the output of the light collector element (14) and a second surface facing towards the input opening of the cover element (15), and the or each optical element exhibits a predetermined optical activity or function in its transmission of light incident thereon which has exited the output of the light collector element (14) and is transmitted by the transmission element (16) towards the input opening of the cover element (15).

23 Claims, 14 Drawing Sheets

(51) Int. Cl.
*F21V 7/00* (2006.01)
*F21V 17/16* (2006.01)
*F21Y 105/18* (2016.01)
*F21Y 115/10* (2016.01)

(52) U.S. Cl.
CPC .......... *F21V 7/0091* (2013.01); *F21V 17/164* (2013.01); *F21Y 2105/18* (2016.08); *F21Y 2115/10* (2016.08)

(56) References Cited

U.S. PATENT DOCUMENTS

| | | | | |
|---|---|---|---|---|
| 2011/0292658 | A1* | 12/2011 | Ho | F21V 5/048 362/307 |
| 2013/0010476 | A1* | 1/2013 | Pickard | F21V 17/10 362/311.03 |
| 2013/0286646 | A1* | 10/2013 | Snell | F21S 8/026 362/231 |
| 2019/0285234 | A1* | 9/2019 | Tang | F21V 5/04 |

OTHER PUBLICATIONS

Intellectual Property Office, Search Report, App. No. GB2014094.3 (Jan. 8, 2021).

* cited by examiner

OPTICAL CELLS FOR MODULAR LUMINAIRES

PRIORITY

This application is the U.S. national phase entry of Intl. App. No. PCT/EP2021/074707 filed on Sep. 8, 2021, which claims priority from GB2014094.3 filed on Sep. 8, 2020. The entire contents of PCT/EP2021/074707 and GB2014094.3 are incorporated herein by reference.

TECHNICAL FIELD

This invention relates to optical cells for modular luminaires, more particularly (though not exclusively) to optical cells for forming luminaires comprising one or more light sources (especially, though not exclusively, LEDs) and which employ a modular system of construction comprising numbers of individual optical cells which can be assembled into various arrangements for producing luminaires of various configurations and designs. More particularly, the invention relates to such optical cells and their components, and to their assembly together with other components of a modular system for forming such modular luminaires.

BACKGROUND AND PRIOR ART

As used herein, the term "luminaire" refers to and means an apparatus or device for emitting light in a particular desired distribution or pattern, comprising at least one light source, and various other structural and/or optical components which are designed to connect the light source(s) to a power supply, to position and protect the light source(s), and to distribute the light emitted by the light source(s) into the desired light output distribution or pattern. Such luminaires may be utilised for lighting applications in a wide range of indoor or outdoor scenarios and settings, including for example: industrial and commercial premises, offices and other workplaces, public buildings, private premises of various kinds, domestic settings, as well as others.

The past decade in the lighting industry can be characterized principally as a transition period from conventional incandescent and fluorescent lighting to LED (light emitting diode)-based lighting. Compared with conventional light bulbs and tubes, LEDs represent much more compact light sources, and they are also much more favourable in terms of energy consumption and environmental impact. However, such advantages also come with various disadvantages.

Looking at their advantages purely from an optical standpoint, small LED light sources give designers much greater flexibility in designing optics which can shape emitted light with much higher degrees of precision and complexity than is possible with conventional light sources. Being small, LED sources also enable the design of more compact luminaires, and they can be easily arranged to form various shapes and layouts which may in itself add aesthetic value to any given final design of luminaire. Due to their higher efficiency of converting electricity into light, compared with conventional light sources, LEDs also play an important role in energy-saving and ultimately less negative impact on the environment.

However, LEDs do have some disadvantages as well. Conversion of electrical energy into luminous energy happens over a very small area of an LED chip. Despite a high efficiency of conversion, there is still a significant portion of the overall converted energy which gets transferred as heat and which is concentrated into a very small area. The heat dissipation then becomes a key problem to solve, especially in the use of LEDs with high luminous flux. The small light-emitting area of an LED may also pose a problem for a user or viewer of a luminaire or other lighting apparatus containing it. If viewed directly, an LED looks like an extremely bright, possibly blindingly so, dot. Therefore it is often desirable to increase the area of a LED's light-emitting surface, which is typically done by an appropriate additional optical element (or optical system) or diffuser. Both of these disadvantages can sometimes be suppressed, for example by arranging lower brightness LEDs into larger arrays—since lower brightness LEDs do not require such intensive cooling and in practice they may not be as blinding for the viewer even without the use of special optics.

In fact, most known LED-based luminaires comprise an arrangement of a plurality of LEDs, typically integrated on a circuit board. Typically they are combined into an optical element with one or more uniform optical features (e.g. diffusers) or embedded individualized optical features (e.g. lenses, reflectors) which convert the LED light into a desired output light distribution pattern. The individualized optical features embedded in an optical element are usually represented by an arrangement or array of one or more lenses and/or reflectors, which may be embossed or molded into such an optical element. Such an arrangement of individualized optics is generally fixed and needs to be synchronized (i.e. matched) with the arrangement of LEDs on the circuit board. Patent documents US 2016/0215955 A1, U.S. Pat. No. 9,212,803 B2, US 2006/0291206 A1 and US 2009/0002985 A1 show some examples of such known arrangements. Examples of luminaires with arrangements of LEDs used in combination with non-individualized optics can be seen in patent documents US 2019/0368683 A1, U.S. Pat. No. 8,579,467 B1 and US 2009/0323334 A1, for example.

There are also known modular systems which can be used to create various luminaire arrangements from preconfigured modules containing an LED on a circuit board and attached optics, such as that described and illustrated in U.S. Pat. No. 8,845,129 B1. These modules can be arranged into linear or rectangular arrays, the modules being connected to each other through the electrical connectors on the LED circuit board, and then installed into a luminaire body. These modules represent individualized optics operating on a single LED which are not pre-arranged into a specific array. The final arrangement of the modules is achieved only at the point of assembly of the final luminaire to create a desired overall module configuration therein.

Another example of a known modular system of components which can be used for illumination is disclosed in EP 3192334 A1, in which a circuit board is designed to accept electrical components including LEDs with further attached optical components. Plural LED sources of the same or different types can be combined with optics of the same or different types, while the circuit board holds them together in one specific arrangement.

Yet another known modular system of optics operating on an array of LEDs is shown in US 2010/0225639 A1. Here a rectangular louver mask array, which controls blocking of the light, is designed to accept optics carriers in each of the respective positions of the array cells, and various optical elements for processing light emitted by respective LEDs can be inserted into these carriers. The entire assembly is positioned over an array of the LEDs.

All the above different approaches to arranging specific kinds of optics over an array of LEDs play a role in how luminaires have developed in the lighting industry to what we see and are commercially available today. Pre-arranged fixed arrays of individual optics can be particularly useful in high volume production of luminaires, and modular systems with individualized optics give designers more freedom in designing various arrays suitable for various designs of luminaires.

However, known systems and techniques for providing pre-arranged arrays of individual optics for use with corresponding arrays of LEDs tend to be over-engineered and are still far from ideal, especially in terms of simplicity of construction, ease of use and versatility. Furthermore, the known systems and techniques have limitations in their ability to be applied to the production of luminaires across a wide range of sizes, shapes and designs, whilst still maintaining the versatility and advantages of a modular-type system.

It is also to be noted that many known constructions of individual optical cells for use in forming luminaires themselves tend to be over-engineered and are often tailored to just one specific luminaire application or design, which typically makes them unsuited to a truly modular system and reduces their versatility in being applicable to luminaires of varying configurations and designs.

It is thus a primary object of the present invention to address the shortcomings of the known art of luminaires and the limitations of known optical cells for forming luminaires, and to provide a new, simpler and more versatile design of optical cell for use in forming luminaires by use of a modular system that is mechanically and constructionally simple and cheap to manufacture, easy to use and assemble, and versatile in being able to be applied together with other components of a modular system for forming such modular luminaires across a wide range of sizes, shapes, designs and end-uses.

SUMMARY OF THE INVENTION

Accordingly, in a first aspect the present invention provides an optical cell for forming a luminaire, the optical cell comprising:

(i) a light collector element, (ii) a cover element attached to the light collector element, and (iii) a transmission element mounted between the light collector element and the cover element;

wherein:

(iv) the light collector element comprises a body including:

an input for receiving and collecting light from at least one light source, an output for propagating collected light towards the transmission element, at least one wall defining one or more portions of the body between its input and output and configured for collecting light entering the body via its input and conveying or directing said light towards its output, and attachment means for mechanically attaching the body of the light collector element to the cover element and securing the transmission element between the light collector element and the cover element;

(v) the cover element comprises:

an input opening facing towards the transmission element and for receiving light transmitted by the transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and (vi) the transmission element comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element.

In some practical embodiment forms of the above-defined optical cell of the first aspect, it may be provided in a physical form in which at least one light source is present, or has been mounted, positioned or otherwise included, in or on or adjacent the light collector element. In this case, in a second aspect the present invention provides an optical cell for forming a luminaire, the optical cell comprising:

(i) a light collector element, and at least one light source mounted or positioned in or on or adjacent the light collector element, (ii) a cover element attached to the light collector element, and (iii) a transmission element mounted between the light collector element and the cover element;

wherein:

(iv) the light collector element comprises a body including:

an input for receiving and collecting light from the at least one light source, an output for propagating collected light towards the transmission element, at least one wall defining one or more portions of the body between its input and output and configured for collecting light entering the body via its input and conveying or directing said light towards its output, and attachment means for mechanically attaching the body of the light collector element to the cover element and securing the transmission element between the light collector element and the cover element;

(v) the cover element comprises:

an input opening facing towards the transmission element and for receiving light transmitted by the transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and (vi) the transmission element comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element.

In practical embodiments of the above-defined optical cell of the second aspect, the at least one light source may be mounted or positioned in or on or adjacent the said input of the light collector element, and especially the at least one light source may be mounted or positioned relative to the said input of the light collector element such that light from the said light source is capable of being received in and collected by the said input of the light collector element.

In some such practical embodiment forms of the above-defined optical cell of the second aspect, in addition to the above-defined light collector element, cover element and transmission element, the optical cell may further comprise at least one circuit board or wiring board, or a portion of a circuit board or wiring board, having the said at least one light source mounted, or pre-mounted, thereon.

In a third aspect the present invention provides a luminaire comprising:

one or more optical cells according to the first aspect of the invention or any embodiment thereof;

a body or frame in which is/are contained the said one or more optical cells; and one or more light sources, the or each said light source being mounted or positioned in or on or adjacent a respective light collector element of a respective optical cell.

In some embodiments of the above-defined luminaire of the third aspect, the luminaire may further comprise at least one circuit board or wiring board on which is/are mounted, or has/have been pre-mounted, the said one or more light sources.

In some practical embodiment forms of the above-defined luminaire of the third aspect, it may be provided in a physical form in which the one or more light sources has/have not yet been included, positioned or mounted in or on or adjacent the respective light collector element(s) of the respective optical cell(s). In this case, in a fourth aspect the present invention further provides an assembly for forming into a luminaire, the assembly comprising:

one or more optical cells according to the first aspect of the invention or any embodiment thereof; and a body or frame in which is/are contained the said one or more optical cells;

wherein each respective light collector element of a respective optical cell is for containing or having mounted or positioned therein or thereon or thereadjacent a respective one of the said one or more light sources.

In some other practical embodiment forms of the above-defined luminaire of the third aspect, it may—perhaps practically more usually or usefully—be provided in a physical form in which the one or more light sources (optionally mounted or pre-mounted on at least one circuit board or wiring board, or a portion of a circuit board or wiring board) has/have already been included, positioned or mounted in or on or adjacent the respective light collector element(s) of the respective optical cell(s), but the optical cell(s)+light source(s) (optionally+circuit/wiring board or portion thereof) combination(s) (or pre-assembled optical cell(s)+light source(s) (optionally+circuit/wiring board or portion thereof) combination(s) or unit(s)) has/have not yet been mounted or positioned in the body or frame of the luminaire. In this case, in an alternative fourth aspect the present invention further provides an assembly for forming into a luminaire, the assembly comprising:

one or more optical cells according to the first aspect of the invention or any embodiment thereof; and one or more light sources, the or each said light source being mounted or positioned in or on or adjacent a respective light collector element of a respective optical cell, optionally wherein the or each light source is mounted or pre-mounted on at least one circuit board or wiring board, or a portion of a circuit board or wiring board, and the said assembly further comprises said circuit board or wiring board, or portion of either thereof.

In some yet other practical embodiment forms of the above-defined luminaire of the third aspect, it may even be provided in a physical form in which the one or more light sources, especially the one or more light sources mounted or pre-mounted on at least one circuit board or wiring board or a portion of a circuit board or wiring board, has/have already been mounted or positioned in the body or frame of the luminaire, but the optical cell(s) has/have not yet been brought together with, or mounted or positioned in or on or adjacent, the respective light source(s). In this case in a further alternative fourth aspect the present invention further provides an assembly for forming into a luminaire, the assembly comprising:

a body or frame; and one or more light sources mounted or positioned in the body or frame, the or each said light source being mounted or pre-mounted on at least one circuit board or wiring board or a portion of a circuit board or wiring board, wherein the or each light source is arranged and/or positioned and/or configured for having mounted or positioned thereon or thereover or thereadjacent a respective light collector element of a respective optical cell according to the first aspect of the invention or any embodiment thereof, once the or the respective optical cell has been mounted or positioned in the body or frame.

In a fifth aspect the present invention provides a method of production of a luminaire, the method comprising:

(i) forming one or more optical cells according to the first aspect of the invention or any embodiment thereof by, for each optical cell:

(i)(a) providing a light collector element, a cover element for attachment to the light collector element, and a transmission element for mounting between the light collector element and the cover element;

wherein:

the light collector element comprises a body including:

an input for receiving and collecting light from at least one light source, an output for propagating collected light towards the transmission element, at least one wall defining one or more portions of the body between its input and output and configured for collecting light entering the body via its input and conveying or redirecting said light towards its output, and attachment means for mechanically attaching the light collector element to the cover element and securing the transmission element between the light collector element and the cover element;

the cover element comprises:

an input opening facing towards the transmission element and for receiving light transmitted by the transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and the transmission element comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element; and (i)(b) attaching the cover element to the light collector element, with the transmission element mounted therebetween;

(ii) mounting or positioning one or more light sources in or on or adjacent respective light collector element(s) of the respective optical cell(s); and, either before or after this step (ii), (iii) mounting or positioning the one or more optical cells in a body or frame of the luminaire.

In some embodiments of the above-defined method of the fifth aspect, the step (ii) of mounting or positioning the one or more light sources in or on or adjacent respective light collector element(s) of the respective optical cell(s) may comprise mounting or positioning in or on or adjacent respective light collector element(s) of the respective optical cell(s) a or a respective one of at least one circuit board or wiring board, or a portion of a circuit board or wiring board, on which has/have already been pre-mounted the said one or more light sources. Alternatively this particular step (ii) may be thought of or defined as comprising mounting or positioning respective light collector element(s) of the respective optical cell(s) on or over or adjacent respective one(s) of the said one or more light sources, especially on or over or adjacent respective one(s) of the said one or more light sources which has/have already been pre-mounted on the said circuit board or wiring board or portion of a circuit board or wiring board.

However, in some practical embodiment forms of the above-defined method of the fifth aspect, it may be carried out only to the extent that the one or more light sources has/have not yet been included, positioned or mounted in or on or adjacent the respective light collector element(s) of the respective optical cell(s). In this case, in a sixth aspect the present invention further provides a method of production of an assembly for forming into a luminaire, the method comprising:

(i) forming one or more optical cells according to the first aspect of the invention or any embodiment thereof by, for each optical cell:

(i)(a) providing a light collector element, a cover element for attachment to the light collector element, and a transmission element for mounting between the light collector element and the cover element;

wherein:

the light collector element comprises a body including:

an input for receiving and collecting light from at least one light source, an output for propagating collected light towards the transmission element, at least one wall defining one or more portions of the body between its input and output and configured for collecting light entering the body via its input and conveying or directing said light towards its output, and attachment means for mechanically attaching the light collector element to the cover element and securing the transmission element between the light collector element and the cover element;

the cover element comprises:

an input opening facing towards the transmission element and for receiving light transmitted by the transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and the transmission element comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element; and (i)(b) attaching the cover element to the light collector element, with the transmission element mounted therebetween; and (ii) mounting the one or more optical cells in a body or frame of the luminaire, to form the said assembly.

In some other practical embodiment forms of the above-defined method of the fifth aspect, it may—perhaps practically more usually or usefully—be carried out only to the extent that the one or more light sources (optionally mounted or pre-mounted on at least one circuit board or wiring board, or a portion of a circuit board or wiring board) has/have already been included, positioned or mounted in or on or adjacent the respective light collector element(s) of the respective optical cell(s), but the optical cell(s)+light source(s) (optionally+circuit/wiring board or portion thereof) combination(s) (or pre-assembled optical cell(s)+ light source(s) (optionally+circuit/wiring board or portion thereof) combination(s) or unit(s)) has/have not yet been mounted or positioned in the body or frame of the luminaire. In this case, in an alternative sixth aspect the present invention further provides a method of production of an assembly for forming into a luminaire, the method comprising:

(i) forming one or more optical cells according to the first aspect of the invention or any embodiment thereof by, for each optical cell:

(i)(a) providing a light collector element, a cover element for attachment to the light collector element, and a transmission element for mounting between the light collector element and the cover element;

wherein:

the light collector element comprises a body including:

an input for receiving and collecting light from at least one light source, an output for propagating collected light towards the transmission element, at least one wall defining one or more portions of the body between its input and output and configured for collecting light entering the body via its input and conveying or directing said light towards its output, and attachment means for mechanically attaching the light collector element to the cover element and securing the transmission element between the light collector element and the cover element;

the cover element comprises:

an input opening facing towards the transmission element and for receiving light transmitted by the transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and the transmission element comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element; and (i)(b) attaching the cover element to the light collector element, with the transmission element mounted therebetween; and (ii) mounting or positioning one or more light sources in or on or adjacent respective light collector element(s) of the respective optical cell(s), to form the said assembly, optionally wherein the or each light source is already mounted or has already been pre-mounted on at least one circuit board or wiring board, or a portion of a circuit board or wiring board, and the said assembly further comprises said circuit board or wiring board, or portion of either thereof.

In some yet other practical embodiment forms of the above-defined method of the fifth aspect, it may be carried out only to the extent that the one or more light sources, especially the one or more light sources mounted or pre-mounted on at least one circuit board or wiring board or a portion of a circuit board or wiring board, has/have already been mounted or positioned in the body or frame of the luminaire, but the optical cell(s) has/have not yet been brought together with, or mounted or positioned in or on or adjacent, the respective light source(s). In this case in a further alternative sixth aspect the present invention further provides a method of production of an assembly for forming into a luminaire, the method comprising:

(i) forming one or more optical cells according to the first aspect of the invention or any embodiment thereof by, for each optical cell:

(i)(a) providing a light collector element, a cover element for attachment to the light collector element, and a transmission element for mounting between the light collector element and the cover element;

wherein:

the light collector element comprises a body including:

an input for receiving and collecting light from at least one light source, an output for propagating collected light towards the transmission element, at least one wall defining one or more portions of the body between its input and output and configured for collecting light entering the body via its input and conveying or directing said light towards its output, and attachment means for mechanically attaching the light collector element to the cover element and securing the transmission element between the light collector element and the cover element;

the cover element comprises:

an input opening facing towards the transmission element and for receiving light transmitted by the transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and the transmission element comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element; and (i)(b) attaching the cover element to the light collector element, with the transmission element mounted therebetween;

(ii) providing a body or frame for the luminaire;

(iii) mounting or positioning in the body or frame one or more light sources, the or each said light source being mounted or pre-mounted on at least one circuit board or wiring board or a portion of a circuit board or wiring board, wherein the or each light source is arranged and/or positioned and/or configured for having mounted or positioned thereon or thereover or thereadjacent a respective said light collector element of a respective said optical cell, once the or the respective optical cell has been mounted or positioned in the body or frame.

In a seventh aspect the present invention provides a kit of parts for the purpose of forming one or more optical cells for use in forming a luminaire, the kit comprising:

(i) at least one light collector element, (ii) at least one cover element for attachment to the or a respective light collector element, and (iii) at least one transmission element for mounting between the or the respective light collector element and cover element;

wherein:

(iv) the or each respective light collector element comprises a body including:

an input for receiving and collecting light from at least one light source, an output for propagating collected light towards the or the respective transmission element, at least one wall defining one or more portions of the body between its input and output and configured for collecting light entering the body via its input and conveying or directing said light towards its output, and attachment means for mechanically attaching the or the respective light collector element to the or the respective cover element and securing the or the respective transmission element between the or the respective light collector element and cover element;

(v) the or each respective cover element comprises:

an input opening facing towards the or the respective transmission element and for receiving light transmitted by the or the respective transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and (vi) the or each respective transmission element comprises:

one or more planar optical elements, wherein the or each optical element includes a first surface facing towards the output of the or the respective light collector element and a second surface facing towards the input opening of the or the respective cover element, and the or each optical element exhibits a predetermined optical activity or function in its transmission of light incident thereon which has exited the output of the or the respective light collector element and is transmitted by the transmission element towards the input opening of the or the respective cover element.

In some embodiments of the above-defined kit of the seventh aspect, the kit may optionally further comprise one or more light sources for mounting or positioning in or on or adjacent the or each respective said light collector element of the or each respective optical cell.

Moreover, in an eighth aspect the present invention provides a kit of parts for use in forming a luminaire, the kit comprising:

one or more, or any plurality of, optical cells each including:

(i) at least one light collector element, (ii) at least one cover element for attachment to the or a respective light collector element, and (iii) at least one transmission element for mounting between the or the respective light collector element and cover element;

wherein:

(iv) the or each respective light collector element comprises a body including:

an input for receiving and collecting light from at least one light source, an output for propagating collected light towards the or the respective transmission element, at least one wall defining one or more portions of the body between its input and output and configured for collecting light entering the body via its input and conveying or directing said light towards its output, and attachment means for mechanically attaching the light collector element to the or the respective cover element and securing the or the respective transmission element between the or the respective light collector element and cover element;

(v) the or each respective cover element comprises:

an input opening facing towards the or the respective transmission element and for receiving light transmitted by the or the respective transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and (vi) the or each respective transmission element comprises:

one or more planar optical elements, wherein the or each optical element includes a first surface facing towards the output of the or the respective light collector element and a second surface facing towards the input opening of the or the respective cover element, and the or each optical element exhibits a predetermined optical activity or function in its transmission of light incident thereon which has exited the output of the or the respective light collector element and is transmitted by the transmission element towards the input opening of the or the respective cover element;

optionally together with:

a body or frame for containing the said optical cell(s), and optionally any other components of the luminaire, and/or optionally one or more, or a plurality of, said light sources for mounting or positioning in or on or adjacent the or each respective said light collector element of the or each respective optical cell.

In yet another aspect, the present invention provides a kit or set or assemblage of optical cells (or optical cells with universal size) according to any embodiment of the optical cells as defined hereinabove or hereinbelow, comprising:

(i) a light collector element, being any of those defined hereinabove or hereinbelow, (ii) a cover element, being any of those defined hereinabove or hereinbelow, and (iii) a transmission element, being any of those defined hereinabove or hereinbelow, wherein any one or more of the following (a), (b), (c) is/are satisfied, either singly or in any combination thereof:

(a) wherein the outer dimensions and features of each optical cell are substantially the same in all the optical cells of the kit, set or assemblage, optionally wherein different optical cells within the kit, set or assemblage may provide or exhibit different optical functions by use of different transmission elements therein, or different inputs or outputs (especially different input or output openings or surfaces) of or chambers within the light collector elements, or different input or output openings or internal surfaces of the cavities within the cover elements; and/or (b) wherein the cover element of each optical cell of the kit, set or assemblage at the side of its output opening (where the light (or a portion of it) exits the cover element) has substantially the same dimensions in all the optical cells of the kit, set or assemblage; and/or (c) wherein an outer surface of the cover element of each optical cell at the side of its output opening (where the light (or a portion of it) exits the cover element) is at substantially the same distance from a corresponding circuit board or wiring board (or portion of a corresponding circuit board or wiring board) on which is mounted (or pre-mounted) a respective light source, or at substantially the same distance from a corresponding emitting surface of a respective light source, in all the optical cells of the kit, set or assemblage;

whereby all the optical cells of the kit, set or assemblage look substantially the same in terms of their visible dimensions when viewed from the respective directions of the respective output openings of the respective cover elements, and/or whereby the respective output openings of the respective cover elements are the same distance from their respective associated circuit or wiring boards (or portions of either thereof) or their respective associated light sources themselves in all the optical cells of the kit, set or assemblage.

In certain such embodiments of kit, set or assemblage as in the preceding paragraph, it may be the case that in such kits, sets or assemblages the light collector elements and the cover elements may be universal (i.e. substantially identical) in their overall or relevant shapes or dimensions in and across all the optical cells of the kit, set or assemblage. However, even then, each optical cell may, if desired or appropriate, nevertheless provide a different optical function (e.g. is able to generate a different light output distribution) as compared with one or more other optical cells of the kit, set or assemblage—which different functionalities across different ones of the optical cells of the kit, set or assemblage may for instance be achieved by use of different transmission elements in the respective different optical cells, without affecting the respective optical cells' shapes or dimensions. In other words, in this manner various different optical functionalities of the same looking optical cells may be achieved by appropriate selection of the type and construction of the respective transmission element for each respective optical cell (e.g. by use of embedded (i.e. mounted between the respective cover element and light collector element) transmission elements of the nature of differently nano- or microstructured foils etc as between different ones of the optical cells).

Some especially advantageous embodiments of optical cells within the scope of the invention may be designed to allow high densities of the optical cells and their associated light sources (e.g. LEDs) and also to ensure low profiles of the relevant optics of the cells. For instance, in some practical embodiment forms of optical cells as disclosed herein, miniature versions of such optical cells with profile heights lower than about 10 mm may readily be provided, whilst their outer transversal cell dimensions may typically be below about ½×½ inches (~1.27×1.27 cm). Such a small cell size may well not substantially reduce or compromise the variability of their optical functionality, since that may typically come mainly from the cells' transmission elements (for example, as discussed in the context of the embodiments described in the preceding two paragraphs above). More specifically, such small optical cells may still be able to generate all or most main light output distributions required in the luminaire industry, in particular spot light distributions, medium, medium-wide and wide light distributions, asymmetric light distributions (including grazing and wall-washing light distributions), double asymmetric light distributions, batwing distributions, and many others. All of these light output distributions may be achievable by embodiments of optical cells in accordance with the present invention, owing to the high versatility in the design of nano- and micro-structured surface relief transmission elements (e.g. with typical relief depths below about 50 or 20 or 10 or 5 or 3 μm) and in conjunction with the respective optical functions of the respective light collector elements and cover elements and light source(s) of the respective optical cells.

Furthermore, in general, the embodiment optical cells described in the preceding paragraph may in practice be able to be scaled down even further with even smaller sizes of the light-emitting surfaces of the respective light source(s), where an optimum emitting surface characteristic dimension to cell dimension ratio may be between about 1:3 to 1:10.

As used herein, the term "light" is intended to be construed broadly as meaning any wavelength/frequency of electromagnetic radiation in the electromagnetic spectrum. However, in most practical embodiments of the invention, light in the visible region of the spectrum may be employed and may thus be provided by the one or more light sources. However, it may be possible, e.g. in certain more specialist embodiments, for one or more LEDs or other light sources to be employed which emit electromagnetic radiation in one or more non-visible, e.g. infra-red or ultraviolet, regions of the spectrum.

In many embodiments of the invention in its various aspects, the or each light source (or the one or more light sources, as they may alternatively be termed herein) may each comprise one or more LEDs (light emitting diodes). However, it may still be within the scope of the invention, in other embodiments, for the or each light source to each comprise one or more other types of light-emitting device, for example one or more filament-based or halogen-based (or other gas-based) light bulbs or light-emitting devices.

In some such embodiments the or each light source may comprise a single LED (or other light emitting device). In such embodiments, therefore, the or each optical cell may comprise, or may have mounted or positioned therein or thereon or thereadjacent, or may be for having mounted therein or thereon or thereadjacent, a single LED (or other light emitting device).

However, in other such embodiments the or each light source may comprise a plurality of LEDs (or other light emitting devices), e.g. in the form of an array, cluster, series or group, especially one in which the LEDs (or other light emitting devices) are closely or tightly packed so as to be in close proximity to one another. In such other embodiments, therefore, the or each optical cell may comprise, or may have mounted or positioned therein or thereon or thereadjacent, or may be for having mounted therein or thereon or thereadjacent, an array, cluster, series or group of a plurality of LEDs (or other light emitting devices). Within individual such arrays/clusters/series/groups of pluralities of LEDs (or other light emitting devices) the LEDs/devices may be arranged in any desired geometrical manner relative to each other, e.g. symmetrically, asymmetrically, regularly, irregularly, linearly (e.g. in one or more straight or curved lines) or even randomly. Furthermore, within each individual such array/cluster/series/group of a plurality of LEDs (or other light emitting devices) the LEDs/devices may be arranged or mounted substantially in a single plane, e.g. by virtue of being mounted on at least one substantially planar circuit board or wiring board, or substantially planar portion of a circuit board or wiring board.

In certain embodiments of the invention, one or more of the light source(s) may even comprise one or more multi-chip LEDs (such as a dual-chip LED, e.g. a dual colour LED, a quad RGBW chip LED, or even others).

Furthermore, in many embodiments of the invention in its broader aspects as variously defined above, the said one or more light sources which are used to form the luminaire may themselves be mounted or arranged, and especially may be provided ready for use and assembly by being pre-mounted or pre-arranged, on at least one circuit board or wiring board, or at least one portion of a circuit board or wiring board, in substantially a single common plane, especially for example by virtue of being mounted or pre-mounted on a single common planar circuit board or wiring board, or a single common planar portion of either thereof, or a plurality of individual circuit board or wiring board elements each lying in a common plane.

Alternatively, however, in certain other embodiments of the invention in its broader aspects as variously defined above, the said one or more light sources which are used to form the luminaire may themselves be mounted or arranged, and may especially be provided ready for use and assembly by being pre-mounted or pre-arranged, either:

(i) on a single common circuit board or wiring board, or a single common portion of either thereof, which is shaped or configured in a substantially non-planar, e.g. arcuate or otherwise curved in three dimensions, shape or configuration, or (ii) on a plurality of individual circuit board or wiring board elements which are collectively arranged or configured relative to each other so as to form a substantially non-planar, e.g. arcuate or otherwise curved in three dimensions, shaped or configured circuit board/wiring board arrangement.

In any embodiment of a luminaire or any assembly within the scope of the invention, means may be provided, e.g. in the form of appropriate wiring and/or circuitry, for connecting each LED (or other light emitting device) to an appropriate electrical power source, which may for example be provided either as an external power source (e.g. the electrical mains, optionally via a transformer) or alternatively as an on-board battery or other power supply, e.g. contained within the overall luminaire body or frame.

According to the invention, the light collector element of the or each optical cell comprises a body including:

an input for receiving and collecting light from at least one light source, an output for propagating collected light towards the transmission element, at least one wall defining one or more portions of the body between its input and output and configured for collecting light entering the body via its input and conveying or directing said light towards its output, and attachment means for mechanically attaching the body of the light collector element to the cover element and securing the transmission element between the light collector element and the cover element;

In a first species of some embodiments, the light collector element of the or each optical cell may take the form of a hollow body, the body comprising:

an input opening for receiving and collecting light from at least one light source, an output opening for propagating collected light towards the transmission element, at least one internal wall defining a chamber within the light collector element between its input and output openings, the chamber wall(s) being configured for collecting light entering the chamber via the light collector element's input opening and conveying or directing or redirecting said light, or a portion of said light, towards its output opening, and attachment means for mechanically attaching the light collector element to the cover element and securing the transmission element between the light collector element and the cover element.

However in a second species of some embodiments, the light collector element of the or each optical cell may take the form of a body, especially a substantially solid body, of light-permeable or light-transparent or light-transmissible material, the body comprising:

an input surface for receiving and collecting light from at least one light source, an output surface for propagating collected light towards the transmission element, at least one wall, especially at least one exterior wall, defining one or more portions of the body of the light collector element between its input and output surfaces, the at least one wall being configured for collecting light entering the body via the light collector element's input surface and redirecting and/or guiding said light, or a portion of said light, towards its output surface at least in part by means of TIR (total internal reflection) phenomena, and attachment means for mechanically attaching the light collector element to the cover element and securing the transmission element between the light collector element and the cover element.

Thus in various embodiments of the invention in its various aspects, the light collector element of the or each optical cell, or of any one or more optical cells independently of any one or more other optical cells, may take the form of either a hollow body species with a light-conveying/directing/redirecting chamber therewithin or a solid body species which relies at least in part on TIR for its light-conveying/guiding capability.

Thus, in embodiments of luminaires according to the invention in which a plurality of optical cells are provided or used, the light collector element of each of any one or more optical cells may be selected from the above-defined first or second species types independently of the light collector element of the other optical cell(s) of the plurality, whereby different individual ones of the optical cells may comprise either the same or different ones of the above-defined species types of light collector element. Thus, although in many embodiment luminaires it may be the case that all the optical cells comprise the same species type of light collector element, it may be possible in certain other embodiment luminaires for one or more of the optical cells to be of one species type and one or more other(s) of the optical cells to be of the other, different species type.

In some embodiments of the invention, the light collector element of the first species type may comprise any suitably shaped and/or configured body, housing, casing or container, e.g. of a moulded plastics material, which comprises one or more internal walls defining and enclosing the said internal chamber therewithin. In many practical embodiments, the chamber may be configured for containing, or for having protruding thereinto, or for having mounted adjacent a lower opening or mouth thereof ("lower" in this context meaning a side of the light collector element distal or remote from the cover element) the respective light source(s) when the components of the final luminaire are fully assembled.

In some embodiments the input opening of the light collector element of the first species type may thus comprise an opening, mouth or aperture in a lower side or basal wall thereof, for receiving and collecting light from the at least one light source associated with that optical cell. Such a lower input opening, mouth or aperture may for example be generally substantially circular in shape, or alternatively may of another suitable shape, e.g. elliptical, polygonal, rectangular, square, etc.

In some embodiments the output opening of the light collector element of the first species type may likewise comprise an opening, mouth or aperture in an upper side or top wall thereof, for propagating light collected from the at least one light source associated with that optical cell and passing through the chamber towards the transmission element. Such an upper output opening, mouth or aperture may for example be generally substantially circular in shape, or alternatively may of another suitable shape, e.g. elliptical, polygonal, rectangular, square, etc. In some embodiments the shape of the upper output opening, mouth or aperture may be substantially geometrically similar to the shape of the lower input opening, mouth or aperture. Alternatively or additionally, in some embodiments the upper output opening, mouth or aperture may be substantially larger in diameter or width than the lower input opening, mouth or aperture.

In embodiments the light collector element of the first species type may for instance be injection-moulded from any suitable plastics material, especially any suitable polymeric material, such as a suitably selected molecular-weight and/or cross-linked variety or species of polymeric substance, examples of which are numerous and readily available in the art of plastics. For example, a polycarbonate (PC) may be one such useful material, although many other examples may also be used instead, such as any of the following: polymethylmethacrylate (PMMA), acrylonitrile-butadiene-styrene (ABS), epoxy resins, glass-reinforced plastic (especially polyester-based) (GRP), polytetrafluoroethylene (Teflon), high density polyethylene (HDPE), polystyrene (PS), high impact polystyrene (HIPS), low density polyethylene (LDPE), polypropylene (PP), melamine formaldehyde (MF), polyamides (e.g. nylons) (PE), phenolic resins (e.g. phenol formaldehyde (PF)), polyacrylonitrile (PAN), polyesters (e.g. unsaturated polyester resin (UPR)), polyethylene terephthalate (PET), polybutylene terephthalate (PBT), polyvinyl chloride (PVC), unplasticized PVC (uPVC), styrene-acrylonitrile (SAN), sheet moulding compounds (SMC) (e.g. sheets of glass fibre impregnated with polyester resin), thermoplastic polyurethanes (TPU), to name but a few.

As an alternative to plastics materials, the light collector element of the first species type may instead be formed from a metal or metal alloy, e.g. steel, aluminium, an aluminium alloy, as well as other metals or alloys with suitable physical properties. Any suitable known manufacturing and/or processing techniques may be used for such metallic light collector elements' production, such as forming (e.g. sheet forming), casting and/or machining production methods.

In some embodiment forms of the or each optical cell, the light collector element of the first species type may comprise at least one reflecting and/or collimating element or feature for reflecting and/or collimating light entering the chamber therewithin from the light source associated with that optical cell and directing or redirecting that light towards the chamber's output opening and thus towards the transmission element, and optionally further onwards towards the cover element (and in particular towards the input opening of the cover element) of that optical cell.

In some such embodiments the at least one reflecting and/or collimating element or feature may comprise one or more of the said internal walls themselves that define the chamber within the light collector element. Such internal walls may thus in some embodiments comprise, or may function as, one or more light-reflecting walls or surfaces and/or one or more internal walls or surfaces that function to collimate light passing through the chamber in the light collector element. The or each internal light-reflecting and/or light-collimating wall or surface may for example be formed of or coated with any suitable light-reflecting material, such as a metal or metal alloy, e.g. consisting of or containing aluminium or alternatively silver or gold, or other light-reflecting and/or light-collimating substance. The light-reflecting coating may typically be applied to one or more internal walls or surfaces of the body, housing, casing or container which forms the main structure of the light collector element, and such coating may be effected by means of any suitable known coating technique, e.g. vacuum deposition, as well as others.

In some embodiments, the one or more internal walls or surfaces of the light collector element of the first species type, especially that/those internal walls or surfaces which are formed of or coated with a light-reflecting and/or light-collimating material, may be of any suitable geometrical shape, especially in their regions or portions between the light collector element's input and output openings, when viewed in plan or in transverse cross-section. For example, a light collector element with internal walls or surfaces of, or configured in, a generally substantially circular shape (when viewed in plan or in transverse cross-section) may typically be employed. However, other internal shapes are possible instead, e.g. elliptical, rectangular, square, polygonal (e.g. hexagonal), etc.

In some such embodiments the general shape—when viewed in plan or in transverse cross-section—of the internal walls or surfaces of the light collector element of the or each optical cell may be substantially geometrically similar to the corresponding shape, also when viewed in plan or in a plane parallel to the said transverse cross-section—of either or both of the upper output opening, mouth or aperture and/or the lower input opening, mouth or aperture of the light collector element.

In some embodiments the internal wall(s) defining the chamber within the light collector element of the first species type may be configured such that the chamber is generally substantially conical, part-conical or frusto-conical in its three-dimensional shape, especially with its diameter/width increasing passing from the light collector element's input opening to its output opening. In other embodiments, however, other three-dimensional shapes of the chamber may be possible instead, by virtue of the chamber's defining internal wall(s) being configured accordingly. Such alternative chamber shapes may for example be generally substantially cylindrical, or pyramidal (especially inverted pyramidal) with any number of sides from 3 upwards (e.g. a pyramid with from 3 to 6 or 7 or 8 sides), or even other geometrical or polyhedral shapes.

In some embodiments of the invention, the light collector element of the second species type may comprise any suitably shaped and/or configured substantially solid body of light-permeable or light-transparent or light-transmissible material, e.g. of a moulded plastics material or a glass, which comprises one or more external walls, especially one or more external side walls, configured so as redirect and/or guide light, or a portion of the light, that has entered the body towards the body's output surface at least in part by virtue of one or more TIR (total internal reflection) phenomena. In some such embodiments the body may, if desired or appropriate, be formed or shaped or configured with at least part of its input surface including at least one recess or indentation for accommodating therewithin, or for having protruding thereinto, or for having mounted thereadjacent, the respective light source(s) associated with that optical cell when the components of the final luminaire are fully assembled.

In some such practical embodiments, the one or more external side walls of the light collector element of the second species type may be shaped or configured in any suitable or appropriate or desired shape or configuration, or combination of shapes or configurations in different portions of said external side wall(s), which act(s) to effect the desired TIR (total internal reflection) phenomena which at least in part serve to redirect and/or guide light, or a portion of the light, that has entered the body towards the body's output surface. Suitable such exterior shapes of any one or more of, or one or more portions of, the TIR solid body side wall(s) may include, for example: conical, part-conical or frusto-conical, paraboloidal, hyperboloidal, cylindrical, pyramidal (especially inverted pyramidal) with any number of sides from 3 upwards (e.g. a pyramid with from 3 to 6 or 7 or 8 sides), or circular or elliptical or polygonal in horizontal or transverse cross-section, or with side wall(s) or one or more portions of one or more side walls being either substantially planar or alternatively curved or arcuate in shape moving from the body's input surface to its output surface with a curve function defined by any suitable/appropriate geometric curve function, especially a curve function that provides the TIR capability.

Suitable materials for forming, e.g. by moulding, the solid body of the or each light collector element of the second species type may be selected from any suitable light-permeable or light-transparent or light-transmissible material, e.g. various plastics materials, such as polycarbonate (PC), polymethylmethacrylate (PMMA), polyethylene terephthalate (PET), or a glass.

In some embodiments the light collector element of either the first or second species types may include support means for supporting the transmission element in the finally assembled optical cell, especially in order to assist in effecting a secure and stable supported mounting of the transmission element, relative to the light collector element and the cover element, in the finally assembled optical cell. Such support means may for example comprise one or more supporting walls, wall portions, ledges, recesses, shoulders, lands or surfaces of, or forming part of, the light collector element.

In some embodiments the light collector element of either the first or second species types may include mounting means for mounting the light collector element on a circuit board or wiring board, or a portion of either thereof, carrying the respective LED(s) (or other light source(s)) for association with that respective optical cell. Such mounting means may take any of various forms: For example:

(i) the mounting means may comprise one or more, e.g. a plurality of or one or more pairs of, pins, spigots, ribs, protrusions, detents, clips, hooks, retaining members/elements, friction-fit or snap-fit elements, or solderable components (e.g. pins, terminals, connectors, electronic components, spring contacts, etc, or even surface-mounted components such as those compatible with "pick & place" technology), or other (inter-) engagement elements, provided on one of the light collector element and a portion of the circuit- or wiring board (usually on the light collector element itself), and a corresponding or appropriate number of one or more holes, apertures, recesses, grooves, channels, notches, or corresponding clip, hook, retainer, friction-fit or snap-fit elements, or solderable components (e.g. pins, terminals, connectors, electronic components, spring contacts, etc, or even surface-mounted components such as those compatible with "pick & place" technology) or other (inter-) engagement elements (for inter-engagement with the aforementioned (inter-)engagement element(s)) provided on the other of the light collector element and the portion of the circuit- or wiring board (usually on the portion of the circuit- or wiring board itself), whereby the light collector element can be united with the circuit- or wiring board through inter-engagement of the respective pairs of inter-engagement elements; and/or (ii) the mounting means may comprise a suitably sized, shaped and positioned land, seating element or portion, or mounting surface on at least one of, optionally both of, the light collector element and a portion of the circuit- or wiring board, via which the light collector element can be adhered to the circuit- or wiring board, e.g. by use of a suitable adhesive (examples of which are well-known in the art and widely commercially available); and/or (iii) the mounting means may comprise one or more sockets (e.g. of metal and/or plastics material), especially a socket provided on one of the light collector element and a portion of the circuit- or wiring board (usually the latter) into which can be plugged a corresponding pin, spigot, protrusion, or other pluggable securement element provided on the other of the light collector element and a portion of the circuit- or wiring board (usually the former).

Where such mounting means is of type (ii) above, in some such embodiments a mounting surface of the light collector element and/or a mounting surface of the portion of the circuit- or wiring board may be furnished with an adhesive layer or one or more adhesive lands/patches. The adhesive may be of any of various known types, such as self-adhesives, UV- or thermally activated adhesives, adhesives resistant to the high temperatures (especially above 80° C.), etc.

In some embodiments, either in addition to or as an alternative to the provision or inclusion of the above-defined mounting means for mounting the light collector element on a circuit board or wiring board (or a portion of either thereof), the cover element may additionally or alternatively be provided with or include auxiliary mounting means, for mounting the cover element onto the circuit board or wiring board (or a portion of either thereof). Where such auxiliary mounting means are provided, they may take any of the same various forms as defined in (i), (ii) or (iii) immediately above for the mounting means for mounting the light collector element on the circuit- or wiring board (or portion of either thereof). Alternatively any other suitable auxiliary mounting means or device(s), e.g. mechanical attachment element(s)/device(s) or an adhesive, may be used instead for the same purpose.

In practising many embodiments of the invention in its various aspects the one or more light sources (e.g. LEDs) that are employed may generally be provided for use and incorporation into the relevant assembly(ies) or luminaire(s) or combination(s) with optical cell(s) by virtue of being already mounted or pre-mounted on a circuit board or wiring board (or a portion of either thereof), e.g. a PCB (printed circuit board), prior to actually being mounted into combination with the relevant optical cell(s) or the cell(s) actually being mounted thereon, via the above mounting means.

Such mounting means of type (i) above may inherently also usefully serve as alignment means, for aligning the light collector element into a correct position and/or orientation upon it being mounted on the circuit board or wiring board (or portion thereof).

In some of the above embodiments, especially (though not necessarily) in which the mounting means is of type (i) above where the mounting means comprises one or more pins, spigots, ribs, protrusions, solderable components or similarly shaped (inter-)engagement elements, the mounting means may include or be provided with—or they may themselves also act as—spacer means for defining and setting a predetermined spacing distance between the circuit- or wiring board (or portion thereof) and the light collector element once the latter has been mounted thereon. Such spacer means may comprise, for example, any suitable spacing element, shoulder, flange, collar, leg, pin or other spacing portion.

In embodiments the light collector element of either the first or second species types may include first attachment means, or a component of first attachment means, for mechanically and securely—and optionally also removably—attaching the light collector element to the cover element of the optical cell, with the transmission element secured therebetween. Such first attachment means, or component of such first attachment means, that is provided on the respective light collector element may be provided thereon externally of the body thereof (especially externally of the chamber therewithin when it is of the first species type). Furthermore, any component of such first attachment means that is provided on the respective cover element may be provided thereon externally of the cavity therewithin.

Such first attachment means may take any of various forms: For example, the first attachment means may comprise one or more, especially one or more pairs of or a plurality of, snap-fit connection elements provided on the light collector element which is/are inter-engageable in a snap-fit manner with one or more corresponding snap-fit connection elements provided on the cover element.

Such first attachment means that are constructed or designed so as to render the light collector element removably attachable to the cover element may be particularly useful in some embodiments of the invention where the light collector element is designed or intended to be replaceable or interchangeable with one or more different cover elements, or from one optical cell to another optical cell, especially as may be the case with embodiments of various aspects of the invention which are focused on the luminaire, or the assemblies, or the kits of parts, being of a truly modular nature.

In some example practical forms of such snap-fit-type first attachment means, they may comprise one or more, especially one or more pairs of or a plurality of, elongate legs extending from a wall or attachment portion of one of the light collector element and the cover element, and corresponding one or more, especially one or more pairs of or a plurality of, locating holes or apertures formed in a wall or attachment portion of the other of the light collector element and the cover element. Such leg(s) may for example each include a respective locking or engagement portion, such as a detent, step, notch, hook or catch element, and such hole(s)/aperture(s) may for example each include a respective locking seating, recess, edge, abutment surface or catch feature, for inter-engagement with the aforementioned corresponding snap-fit attachment feature of the respective leg.

In some such embodiments, the elongate leg(s) may be provided on the cover element and the hole(s)/aperture(s) may be provided on the light collector element, although these respective locations of these respective features could be reversed if desired or appropriate.

Where one or more pairs of any such snap-fit-type first attachment features are provided, those respective features within each pair may be located on opposite sides of the light collector and/or the cover element, as the case may be, in order to enhance the stability and secure nature of the attachment.

According to the invention, the cover element of the or each optical cell comprises:

- an input opening facing towards the transmission element and for receiving light transmitted by the transmission element,
- an output opening via which light is outputted from the optical cell, and
- at least one internal surface defining a cavity within the cover element between its input and output openings, the cavity's internal surface(s) being configured for allowing or effecting passage of light, or a portion of the light, through the cavity from the cover element's input opening towards its output opening; and It is to be understood that in the cover element, in the context of the above definition of the cover element's cavity's internal surface(s) being configured "for allowing or effecting passage of light, or a portion of the light" through the cavity from the cover element's input opening towards its output opening, within the scope of this definition is intended to be encompassed any form of "allowing or effecting passage" of light, or any portion of the light, through the cover element's cavity by any one or more portions of one or more of the cavity's internal surface(s). In particular any one or more of the following optical effects may be present:

- (i) in certain embodiments, one or more internal surfaces, or one or more portions of one or more internal surfaces, of the cavity may be configured for allowing passage or propagation of light, or any portion of the light, through the cavity from the cover element's input opening towards its output opening substantially unhindered, e.g. substantially without any interaction with or impingement or incidence on the or the respective cavity internal surface(s) or surface portion(s);
- (ii) in certain embodiments, one or more internal surfaces, or one or more portions of one or more internal surfaces, of the cavity may be configured so as to reflect or redirect or scatter light, or any portion of the light, that interacts therewith or impinges or is incident thereon, as it is conveyed or passes or travels through the cavity from the cover element's input opening towards its output opening;

(iii) in certain embodiments, one or more internal surfaces, or one or more portions of one or more internal surfaces, of the cavity may be configured so as to substantially block or prevent or absorb the passage or travel of light, or any portion of the light, through the cavity from the cover element's input opening towards its output opening, especially that light (or a portion of it) that is so passing or travelling through the cavity at angles (relative to a central axis of the cover element) greater than or beyond one or more predetermined boundary angle(s) (as discussed in further detail below);

(iv) in certain embodiments, any one or more of the effects (i), (ii) and/or (iii) above may be present simultaneously, especially as or when effected by different or discrete portions of the one or more internal surfaces of the cavity or a part thereof.

In some embodiments of the invention in its various aspects, the cover element of the or each optical cell may comprise any suitably shaped and/or configured frame, casing, surround or body, e.g. of a moulded plastics material, which comprises one or more internal surfaces which define and enclose the said internal cavity therewithin.

In some embodiments the said internal cavity within the cover element may be defined by the said internal surface(s) thereof which at least partially unite with or which are at least partially contiguous with or which are at least partially continuations of the wall(s) of the body (or at least an upper portion or upper peripheral region of the body) of the light collector element, especially at least partially continuations of the internal wall(s) of the chamber (or at least an upper portion or upper peripheral region of the chamber) within the light collector element when it is of the first species type.

In some embodiments, in the cover element of the or each optical cell, the at least one internal surface defining the said cavity therewithin between its input and output openings may be configured at least in part not only for simply allowing unhindered passage or propagation of light through the cavity from the cover element's input opening towards its output opening—as per the defined optical effect (i) above—but also—or even alternatively—the at least one internal surface may be configured at least in part for reflecting or redirecting or scattering light incident thereon towards the cover element's output opening—as per the defined optical effect (ii) above.

Alternatively or additionally still, in some other embodiments—as per the defined optical effect (iii) above—the at least one internal surface of the cover element may be configured so as to substantially suppress or block or prevent (e.g. through absorption) passage or propagation through to the cover element's output opening of light rays entering the cavity from the cover element's input opening and which travel in directions defined by angles, relative to a central (or optical) axis direction of the cover element (or relative to a normal axis of the transmission element or a central (or optical) axis direction of the light collector element), greater than one or more predetermined boundary angle(s). Such boundary angle(s) may for instance vary in different radial propagation directions relative to the said axes.

Alternatively or additionally to the preceding feature, in such embodiments the at least one internal surface of the cover element may be configured so as to reflect or redirect or scatter towards the cover element's output opening light rays entering the cavity from the cover element's input opening and which travel in directions defined by angles, relative to a central (or optical) axis direction of the cover element (or relative to a normal axis of the transmission element or a central (or optical) axis direction of the light collector element), greater than one or more predetermined boundary angle(s). Such boundary angle(s) may for instance vary in different radial propagation directions relative to the said axes.

In the above-defined various embodiments involving one or more predetermined boundary angle(s)—which defines the maximum angle of direction of travel at which light rays entering the cavity from the cover element's input opening are able to pass or propagate through the cavity to its output opening without being suppressed, blocked, prevented, or without being reflected or redirected or scattered back into the cavity or towards the cover element's output opening—may be selected according to the overall dimensions, shape, configuration and design of the cover element and/or of the optical cell in question. However, by way of example, in some currently envisaged practical embodiment optical cells within the scope of the invention, a predetermined boundary angle of around 1 or 5 or 10 or 15 or 20 or 25 or 30 or 35 or 40 or 45 or 50 or 55 or 60 or 65 or 70 or 75 or 80 or 85 or 88 or 89° or <90°, or a boundary angle in a range between any two of the aforesaid angles, relative to a central (or optical) axis direction of the cover element (or relative to a normal axis of the transmission element or a central (or optical) axis direction of the light collector element), may be suitable. In certain embodiments, it may be possible for different such boundary angles to apply at different radial propagation directions (relative to the said axes) at which light rays may pass or propagate through the cavity and be so suppressed, blocked, prevented, or reflected or redirected or scattered back into the cavity or towards the cover element's output opening as they propagate radially in those different respective radial propagation directions.

In the preceding definitions, the "central (or optical) axis direction of the cover element" may be defined as an axis perpendicular or normal to a plane of the circuit- or wiring board upon which the optical cell in question is to be mounted, or as a normal to the plane of the input or output (or input or output openings, as the case may be) of the cover or the light collector element, or as a normal to the transmission element surfaces (or its general plane).

The cover element may, as with the light collector element but independently thereof, for instance be injection-moulded from any suitable plastics material, especially any suitable polymeric material, such as a suitably selected molecular-weight and/or cross-linked variety or species of polymeric substance, examples of which are numerous and readily available in the art of plastics. For example, a polycarbonate (PC) may be one such useful material, although many other examples may also be used instead, such as any of the following: polymethylmethacrylate (PMMA), acrylonitrile-butadiene-styrene (ABS), epoxy resins, glass-reinforced plastic (especially polyester-based) (GRP), polytetrafluoroethylene (Teflon), high density polyethylene (HDPE), polystyrene (PS), high impact polystyrene (HIPS), low density polyethylene (LDPE), polypropylene (PP), melamine formaldehyde (MF), polyamides (e.g. nylons) (PE), phenolic resins (e.g. phenol formaldehyde (PF)), polyacrylonitrile (PAN), polyesters (e.g. unsaturated polyester resin (UPR)), polyethylene terephthalate (PET), polybutylene terephthalate (PBT), polyvinyl chloride (PVC), unplasticized PVC (uPVC), styrene-acrylonitrile (SAN), sheet moulding compounds (SMC) (e.g. sheets of glass fibre impregnated with polyester resin), thermoplastic polyurethanes (TPU), to name but a few.

As a possible alternative or addition to, although possibly it may be the same thing as, the above defined optical effect (iii) of the cover element, in some embodiments—if desired or appropriate—the cover element may include one or more anti-glare features. Such features may be designed to eliminate or reduce glare when the light emitted from the optical cell reaches an observer (or viewer), or to prevent or limit light emitted from the optical cell from reaching certain areas in space, or objects or surfaces, outside the optical cell. In some such embodiments, such an anti-glare feature may be constituted by one or more internal walls or surfaces of the cover element having an extended height or upward length (e.g. a height at least that of the height of the light collector element or the distance between the respective light source(s) of that optical cell and a base of the cover element when the optical cell is fully assembled, or a height up to about 1.5 or 2 or 2.5 or even as much as 3 times the height of the light collector element or the distance between the respective light source(s) of that optical cell and a base of the cover element when the optical cell is fully assembled) and being configured so as to have one or more internal walls or surfaces which are oriented at an angle, relative to a central (or optical) axis of the optical cell (especially an axis perpendicular or normal to a plane of the circuit- or wiring board upon which the optical cell in question is to be mounted) of especially in the range of from about 0 or 5 or 10 or 15 or 20 or 30° up to about 50 or 60 or 70 or 80°. As a result of this configuration of the internal wall(s) or surface(s) of the cover element, light rays emanating from the light source associated with that optical cell and being conveyed or directed by the light collector element through the transmission element and into the cavity within the cover element (via the latter's input opening) and towards the cover element's output opening, at an exit angle beyond a certain maximum angle value (namely, an angle dependent on the actual aforementioned wall orientation angle and/or in conjunction with the height of the cover element wall(s)) may be blocked, cut out or (at least partially) absorbed by the cover element's wall material and thereby prevented from exiting the optical cell and causing unwanted glare.

Generally in this context, in various such embodiments there may be no limit on the shape of the cover element and its internal walls, which may in various cases be of any shape in two or three dimensions (or in plan or cross-section) (including flat, planar, curved, arcuate, regular, irregular, symmetrical, asymmetrical, complex-curved, conic-sectioned, etc), provided it blocks or reduces, redirects or scatters at least a portion of the light exiting the transmission element so as to reduce glare when the light emitted from the optical cell reaches the observer (or viewer), or to prevent or limit light emitted from the optical cell from reaching certain areas in space, or objects or surfaces, outside the cell. To assist this, in some embodiments the inner wall(s) of the cover element may even be curved or arcuate, and/or they may be glossy to assist in their redirecting or reflection function or to help reduce scatter of residually reflected light from the wall(s).

By way of example, such a slope or angle of inclination away from the vertical (i.e. away from the axis direction of the optical cell) of the internal wall(s) of the cover element in the region of about 20 to 30° may be suitable for blocking such exiting light rays beyond a certain angle value of, say, about 60°, which may be suitable for many anti-glare applications. However, the exact angle of slope or inclination away from the vertical (i.e. away from the axis direction of the cell) of such internal wall(s) of the cover element in any specific practical embodiment of optical cell may be selected so as to suit or match the particular dimensions, shape and light distribution characteristics of the specific optical cell in question.

It may be possible, in some embodiment implementations of the invention, especially in the kits of the seventh or eighth aspect(s), to provide a plurality of differently configured cover elements for selective use singly with a single given light collector element and transmission element of a given optical cell, wherein each differently configured cover element may have a different angle of slope or inclination of its internal wall(s)/surface(s) and thus a different degree of anti-glare properties in terms of the light ray exit angle beyond which the exiting light rays are blocked. Such plural cover elements, per single given light collector element and transmission element, may thus enhance the modular versatility of some embodiment kits within the scope of these aspects of the invention.

In some embodiments, the cover element of the or each optical cell may, as with the light collector element but independently thereof, have one or more internal walls or surfaces—including those providing the above anti-glare feature—which are of any suitable geometrical shape when viewed in plan or in transverse cross-section. For example, a cover element with internal walls or surfaces of, or configured in, a generally substantially circular shape (when viewed in plan or in transverse cross-section) may typically be employed. However, other internal shapes are possible instead, e.g. elliptical, rectangular, square, polygonal (e.g. hexagonal), etc.

In some embodiments the internal surface(s) defining the cavity within the cover element may be configured such that the cavity is generally substantially part-conical or frusto-conical or part-paraboloidal or part-hyperboloidal in its three-dimensional shape, especially with its diameter/width increasing passing from the cover element's input opening to its output opening. In other embodiments, however, other three-dimensional shapes of the cavity may be possible instead, by virtue of the cavity's defining internal surface(s) being configured accordingly. Such alternative cavity shapes may for example be generally substantially cylindrical, spherical, ellipsoidal, paraboloidal, hyperboloidal, etc, or pyramidal (especially inverted pyramidal) with any number of sides from 3 upwards (e.g. a pyramid with from 3 to 6 or 7 or 8 sides), or even other geometrical or polyhedral shapes.

As already mentioned above, in some embodiments the cover element of the or each optical cell may include one or more, or one or more pairs of, or a plurality of, elements or components of snap-fit-type attachment means for securely attaching the cover element of the optical cell to the light collector element thereof. Such elements or components of snap-fit-type attachment means, e.g. one or more pairs of or a plurality of, elongate legs extending from a wall or attachment portion of the cover element (especially including a respective locking or engagement portion, e.g. a detent, step, notch, hook or catch element) may thus be as already defined above.

According to the invention, the transmission element of the or each optical cell comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element.

In some embodiments of the invention in its various aspects, the transmission element of each optical cell may comprise at least one optically active transmission optical element, such as in the form of a generally flat or planar foil, film, sheet, web, plate, layer or other thin body of optical material exhibiting a desired optical function. That optical function may be any optical function which effects or facilitates a desired distribution and/or one or more output characteristics of light emanating from the respective optical cell, such as by modifying or modulating one or more optical properties (especially directional optical properties) of the light emitted by the respective light source(s) as determined by the optical function of the respective optically active transmission element of the respective optical cell. (Of course, it is within the scope of the invention, in certain embodiments, that the optical function of the transmission element may be, in effect, "zero", such that the transmission element may not substantially alter or interfere with the natural passage of light therethrough, whereby the light from the light source(s) may pass directly to the cell's output (optionally having been directed or redirected (e.g. reflected) from any surface or wall (which may be internal or external, depending on the species type) of the body of the light collector element) via the transmission element.)

In many embodiments the transmission element may be permeable to light, such that it transmits light incident thereon from the respective light source(s) in the respective optical cell and transmits it to the optical cell's output, e.g. in the form of a desired ray or beam of appropriate desired direction, shape, intensity, colour and/or other light property characteristics, which output will normally be via the output opening of the cover element attached to the light collector element.

In many embodiments the transmission element may comprise a said first surface, which is a first major face thereof, and a said second surface, which is a second major face thereof, and at least one of said first and second surfaces, optionally each of said first and second surfaces, comprises or is formed with optical functional relief, especially optical functional relief of a nanometer(s) or micrometer(s) order of size, and more especially nano- or micro-relief which displays either diffractive or refractive behaviour, or a combination of diffractive and refractive behaviour. Suitable sizes of such surface relief features may for example be in the overall range of from about 0.5 or 1 nm up to about 500 μm, with suitable sizes of such surface nano-relief features being for example in the range of from about 0.5 or 1 nm up to about 500 nm, e.g. from about 1 or 2 or 3 nm up to about 10 or 20 or 50 or 100 or 250 nm, and/or suitable sizes of such surface micro-relief features being for example in the range of from about 0.5 or 1 μm up to about 500 μm, e.g. from about 1 or 2 or 3 μm up to about 10 or 20 or 50 or 100 or 250 μm.

Specific examples of surface nano-scale and/or micro-scale optical functional relief, and techniques for how to create or apply it to a variety of optical substrate materials—such as various embossing processes—are all widely known in the art of optics, especially micro-optics and holography, and will be within the general skill and knowledge of the skilled person.

For use in embodiments of the invention, suitable substrate materials for use in forming the transmission element may include various plastics or polymeric materials, such as polycarbonates, UV-curable polymers, acrylic polymers, or alternatively a glass. Alternatively still, plural-layer such transmission elements may instead be used, if that is appropriate, and such plural layers may each independently comprise a substrate material of any of the foregoing materials. Moreover, any one or more of, or even each of, such plural layers in a plural-layer transmission element structure may be provided with an optically functional relief pattern.

The nano- or micro-structure may be directly formed in the substrate material or on its surface, e.g. by molding or embossing or UV-curing or an etching process, or it may be formed in a different material which is then attached to the substrate material via any suitable means or method, e.g. by UV-curing a curable polymer on a glass or plastic substrate and then laminating or gluing the structured material (or film) to the substrate surface.

Die-cutting or any other suitable known technique (e.g. laser cutting, slitting, etc) may for example be used to form any desired shape and size of the transmission element. Transmission element shapes being generally substantially rectangular or square may be typical, although other shapes (e.g. circular, elliptical, polygonal, etc) may be possible. The exact shape of the transmission element in any given embodiment may depend on the overall plan (or transverse-sectional) shape and dimensions of the other optical cell components, i.e. the light collector element and the cover element.

In many embodiments the or each planar optical element of the transmission element may be of substantially uniform or constant thickness.

Suitable thicknesses of the substrate material for forming the or each optical element of the transmission element may be in the range of from about 1 or 5 or 10 or 20 or 30 or 40 or 50 or 100 up to about 300 or 400 or 500 or 800 or 1000 μm, e.g. around 250 μm in some practical example embodiments.

If desired or appropriate, the transmission element may be cut or shaped to include any suitable number of peripheral indents, notches, recesses, channels, or cut-outs, for the purpose of accommodating and allowing to extend therepast any elements or components of snap-fit-type attachment means, e.g. one or more (or any plurality of) elongate legs, that extend between the cover element and the light collector element for the purpose of attaching those two elements together, especially with the transmission element securely and stably trapped or clamped therebetween.

Thus in many practical embodiments of optical cells according to the invention, once the cover element has been attached to the light collector element, the transmission element may be stably and securely mounted therebetween by virtue of being trapped or clamped between those two elements, especially by means of respective clamping surfaces (or surface portions), walls (or wall portions) or abutment features on the respective cover element and light collector element.

If desired or appropriate, in optical cells according to embodiments of the invention, any optical cell may incorporate one or more auxiliary optical elements or components, e.g. one or more lenses, diffusers, micro- or nano-structured elements or films or foils, or glare reduction elements etc, which may also play a part in defining the overall final light output of the respective optical cell, such as by modifying or modulating one or more optical properties of light emitted by the respective light source(s) and passing to the optical cell's output, as determined by an optical function of the respective auxiliary optical element (s)/component(s) of the respective optical cell. Such one or more auxiliary optical elements/components may, if provided, be mounted between the light collector element and the cover element, e.g. adjacent the transmission element, or attached directly (or indirectly) to the light collector element or the cover element.

Optical cells in accordance with embodiments of the invention may be utilised for forming luminaires in a wide variety of numbers, spatial layouts, configurations, combinations, patterns and arrays of such optical cells, in order to build luminaires of a wide range of sizes, shapes, configurations, designs, brightnesses, colours, and optical output characteristics. In particular, optical cells according to embodiments of the invention may be employed either singly or in one or more pluralities of optical cells, for forming into a luminaire.

In many practical embodiment forms a luminaire according to the luminaire aspects of the invention may comprise a plurality of optical cells, each optical cell being, independently of the other optical cells, an optical cell according to any embodiment of any of the optical cell aspects of the invention, as defined herein.

When used in such pluralities, the optical cells may be used to form a luminaire in combination with any other means or components of the luminaire that may be desirable or appropriate, or even necessary, for defining or creating a given or predetermined pattern, spacing(s), spatial arrangement or relative configuration of the various optical cells of the plurality, and/or the overall one or more optical functions or light output characteristics of the final luminaire.

In particular, for example, in some embodiment luminaires a given predetermined pattern, spacing(s), spatial arrangement or relative configuration of the various optical cells of the plurality may be defined by the inherent positioning, especially the relative positioning, of the various LEDs or other light sources mounted (especially pre-mounted) on one or more circuit boards or wiring boards which then has/have the various optical cells mounted thereon. In this manner, the inherent relative positioning of the various pre-mounted LEDs or other light sources on the one or more circuit boards or wiring boards may thus actually define the predetermined pattern, spacing(s), spatial arrangement or relative configuration of the various optical cells in the final luminaire, given that once the respective LEDs or other light sources are mounted in or adjacent their respective light collector elements of their respective optical cells, then the relative positioning of the LEDs (or other light sources) needs to be the same as, or to correspond to, or to match, or to be synchronized with, the desired predefined relative configuration or pattern of the optical cells in the final luminaire.

However, in other embodiment luminaires a given predetermined pattern, spacing(s), spatial arrangement or relative configuration of the various optical cells of the plurality may be alternatively or additionally defined—i.e. alternatively or additionally to any such predetermined pattern, spacing(s), spatial arrangement or relative configuration of the various optical cells defined by the inherent relative positioning of the various pre-mounted LEDs (or other light sources) on the one or more circuit boards or wiring boards—by use of at least one configuring element which defines and effects, or helps to define and effect, a desired or predetermined relative configuring or positioning of the various optical cells of the plurality, wherein the configuring element includes mounting means for accommodating the respective optical cells in the said desired predetermined pattern, spacing(s), spatial arrangement or relative configuration.

Such mounting means may, in many such embodiments, be constituted by, or provided by virtue of, the configuring element comprising a sheet or plate or film of material having one or more apertures therein in the said predetermined pattern, spacing(s), spatial arrangement or relative configuration, each aperture being for receiving therein a respective one of the optical cells.

When it is used to construct such embodiment luminaires, such a configuring element may be employed to assemble the plurality of optical cells into a desired array with the said predetermined pattern, spacing(s), spatial arrangement or relative configuration either before or after any circuit board or wiring board carrying the pre-mounted LEDs or other light sources is/are brought together with the various optical cells or has/have the optical cells mounted thereon.

However, in some practical embodiments the configuring element may inherently comprise its one or more apertures in a predetermined pattern, spacing(s), spatial arrangement or relative configuration which already corresponds to the predetermined pattern, spacing(s), spatial arrangement or relative configuration of the LEDs or other light sources pre-mounted on their respective circuit board or wiring board, prior to the optical cell(s), optionally together with the configuring element having the optical cells already mounted in the relevant apertures thereof, being mounted thereon.

Thus, in some embodiments of any of the above-defined luminaire of the third aspect of the invention, or the above-defined assemblies of the fourth aspect of the invention, or the above-defined kits of the seventh or eighth aspects of the invention, the relevant luminaire or assembly or kit (as the case may be) may further comprise:

a configuring element for accommodating the one or more optical cells in a predefined relative configuration or pattern in the luminaire, wherein the configuring element comprises a sheet or plate or film of material having one or more apertures therein in the said predefined relative configuration or pattern, each aperture being for receiving therein a respective one of the said optical cells.

Furthermore, in some embodiments of the above-defined method of the fifth aspect, or the above-defined methods of the sixth aspect, the step (i) of forming the one or more optical cells may additionally comprise, for each optical cell, additional steps (i)(c) and (i)(d), subsequent to step (i)(b), which comprise:

(i)(c) providing a configuring element for accommodating the one or more optical cells in a predefined relative configuration or pattern in the luminaire, wherein the configuring element comprises a sheet or plate or film of material having one or more apertures therein in a predefined relative configuration or pattern, each aperture being for receiving therein a respective one of the said optical cells; and (i)(d) inserting the respective optical cell into a respective aperture in the configuring element.

When such a configuring element is used—together with one or more pluralities of optical cells according to any embodiment of the various optical cell aspects of the present invention—to construct luminaires in accordance with embodiments of the luminaire aspects of the invention, the configuring element may take any of various embodiment forms, as will now be defined:

In many embodiment forms, the configuring element may comprise, or may be in the form of, a sheet, plate or film, especially a sheet, plate or film of substantially uniform thickness. In some such embodiment forms the sheet, plate or film may be substantially planar or flat. Alternatively in other embodiment forms the sheet, plate or film may be curved or arcuate in three dimensions (or it may be formable into such a curved or arcuate shape), e.g. so as to conform to any desired geometric shape function.

Typical thicknesses of the sheet, plate or film material may for example be in the approximate range of from about 0.2 or 0.3 or 0.4 or 0.5 or 1 up to about 3 or 4 or 5 mm. Suitably the configuring element may for example be die-cut (or alternatively prepared by means of sawing, machining, laser-cutting or water-jet-cutting) from a stock sheet, plate or film of the relevant material, the die-cutting being such as to form the required shape and configuration of the configuring element with the predetermined pattern or arrangement of apertures actually formed therein.

In some such embodiment forms, the sheet, plate or film may be of a sufficient thickness, and/or formed of a suitable material, such that the sheet, plate or film is of sufficient strength and rigidity so as to be able to substantially hold its own shape in space, especially as a flat planar shape or alternatively as an arcuate or curved-in-three-dimensions shape, i.e. without significant bending or distortion, and also so as to provide a substantially rigid and firm mounting for the various optical cells received in the apertures therein.

Alternatively in other embodiment forms, the sheet, plate or film may have a small or medium degree or amount of flexibility and/or resilience, e.g. in order to be able to adopt or conform to a desired non-planar, e.g. arcuate or curved-in-three-dimensions, shape or configuration when mounted within the body or frame of the luminaire. In certain embodiments, for example when the configuring element is made from metal or metal alloy (e.g. sheet metal/alloy), the non-planar shape may be achieved by preforming the sheet into the desired form or configuration by any suitable known method.

In many typical embodiment forms, the material of the configuring element may be, or may comprise, a plastics material, especially any suitable polymeric material, such as a suitably selected molecular-weight and/or cross-linked variety or species of polymeric substance, examples of which are numerous and readily available in the art of plastics. The polymer may for instance be or comprise a thermoplastic or thermosetting polymer. By way of example, some suitable polymeric materials, which may be used either singly or any combination, may include any of the following: polycarbonates (PC), polymethylmethacrylate (PMMA), acrylonitrile-butadiene-styrene (ABS), epoxy resins, glass-reinforced plastic (especially polyester-based) (GRP), polytetrafluoroethylene (Teflon), high density polyethylene (HDPE), polystyrene (PS), high impact polystyrene (HIPS), low density polyethylene (LDPE), polypropylene (PP), melamine formaldehyde (MF), polyamides (e.g. nylons) (PE), phenolic resins (e.g. phenol formaldehyde (PF)), polyacrylonitrile (PAN), polyesters (e.g. unsaturated polyester resin (UPR)), polyethylene terephthalate (PET), polybutylene terephthalate (PBT), polyvinyl chloride (PVC), unplasticized PVC (uPVC), styrene-acrylonitrile (SAN), sheet moulding compounds (SMC) (e.g. sheets of glass fibre impregnated with polyester resin), thermoplastic polyurethanes (TPU), to name but a few.

Alternatively the material of the configuring element may be a metal or a metal alloy (e.g. aluminium or an aluminium alloy). Any suitable known manufacturing and/or processing techniques may be used for such metallic configuring elements' production, such as forming (e.g. sheet forming), and/or machining production methods.

In many practical embodiment forms, the material of the configuring element may be an optically inactive material, meaning that the material substantially does not perform or exhibit any significant degree of optical functionality of the nature of diffraction, refraction or other modification of the wavelength, phase, directional or intensity characteristics of transmitted or reflected light passing through or incident on the configuring element. Thus, in such practical embodiments the material of the configuring element may substantially not contribute in any significant way to the overall optical functionality of the or each optical cell.

In some embodiment forms, the configuring element may comprise alignment means for defining and/or facilitating appropriate or correct positioning and/or orientation of the configuring element, or an arrangement or assembly comprising it (together with optical cell(s)), in the body or frame of the luminaire into which it is, or is to be, incorporated. Such alignment means may for example comprise any suitable number of (e.g. one, two, three, four, five, six, or possibly even more than six) and spatial or configurational arrangement of lugs, tabs, wings, flanges, ribs, collars, detents, pins, protrusions, holes, recesses, channels, grooves, notches, etc, which may for example (especially in the case of a plurality thereof) be located on opposite or opposed or spaced-apart sides or portions of the configuring element.

In practical embodiment forms, the or each aperture in the configuring element may be shaped and/or configured to receive therein a respective one of the optical cells. At least part of the defining wall(s) of the or each aperture in the configuring element may substantially geometrically match or duplicate the external shape of at least part of the respective optical cell—such as, in particular, at least part of the respective light collector element or cover element thereof—especially so that the respective optical cell may be retained in its respective aperture in the configuring element by means of a simple friction fit.

Alternatively, in other embodiment forms, each optical cell may be receivable and securable in its respective aperture in the configuring element by virtue of respective securement, retention or locking means, e.g. one or more locking detents, clips, pins, lugs, hooks or other suitable mechanical securement/retention/locking elements or devices.

However, in some embodiment forms, at least part of the defining wall(s) of the or each mounting aperture in the configuring element, together with at least part of an external wall of the respective optical cell (such as, in particular, at least part of an external wall of the respective light collector element or cover element thereof), may collectively comprise one or more orientation means for effecting reception of the respective optical cell (or relevant element thereof) in the respective aperture in any selected one of one or two or a plurality of specific discrete or fixed possible orientations relative to each other. Such one or two or more possible orientations may for instance be defined by the rotational symmetry of the respective optical cell. Such orientation means may for example comprise any suitable number of, especially any suitable number of pairs of, mutually inter-engageable inter-engagement elements or features provided on each of the external wall of the respective optical cell (or relevant part or element thereof) and the defining interior wall(s) of the respective aperture of the configuring element. Practical examples of such orientation means may include any suitable number, positioning and spatial arrangement of inter-engageable lugs, tabs, wings, flanges, ribs, collars, detents, pins, protrusions, holes, recesses, channels, grooves, notches, etc.

Furthermore, in some embodiment forms of the or each optical cell, the optical cell may further comprise second attachment means, or a component of second attachment means, for mechanically and securely—and optionally also removably—attaching the optical cell to a said configuring element that is used to define and effect, or help to define and effect, the desired or predetermined relative configuring or positioning of the respective optical cells in the final luminaire or assembly for use in forming same. Such second attachment means, or component of such second attachment means, that is provided on the respective optical cell may be provided thereon externally thereof.

Such second attachment means may take any of various forms: For example, the second attachment means may comprise a simple friction-fitting engagement between an outer wall of (e.g. an outer wall of a lower or an upper portion of) the respective optical cell and the defining wall(s) of a respective mounting aperture in the configuring element.

Alternatively the second attachment means may comprise one or more, especially one or more pairs of or a plurality of, snap-fit connection or docking elements provided on the optical cell which is/are inter-engageable in a snap-fit manner with one or more corresponding snap-fit connection or docking elements provided on the configuring element. The one or more corresponding snap-fit connection or docking elements provided on the configuring element may be provided adjacent a respective mounting aperture in the configuring element into which the respective optical cell is to be mounted. In some example practical forms of such snap-fit-type second attachment means, they may comprise one or more, especially one or more pairs of or a plurality of, legs, pins, spigots or protrusions extending from a lower wall or lower attachment portion of the respective optical cell, and corresponding one or more, especially one or more pairs of or a plurality of, locating holes, apertures or recesses formed in the configuring element, especially formed therein adjacent the respective mounting aperture therein into which the respective optical cell is to be mounted. Such leg(s)/pin(s)/spigot(s)/protrusion(s) may for example each include a respective locking or engagement portion, such as a detent, step, notch, hook or catch element, and such hole(s)/aperture(s)/recess(es) may for example each include a respective locking seating, recess, edge, abutment surface or catch feature, for inter-engagement with the aforementioned corresponding snap-fit attachment feature of the respective leg/pin/spigot/protrusion. In some such embodiments, the leg(s)/pin(s)/spigot(s)/protrusion(s) may be provided on the respective optical cell and the hole(s)/aperture(s)/recess(es) provided on the configuring element, whereas in alternative such embodiment the locations of these respective snap-fit docking components may be reversed so that the leg(s)/pin(s)/spigot(s)/protrusion(s) are provided on the configuring element and the hole(s)/aperture(s)/recess(es) are provided on the respective optical cell.

Further alternatively the second attachment means may comprise a mechanically simpler docking-type inter-engagement, in which each one of the respective optical cell and the configuring element is provided with a respective one of a pair of mutually inter-engageable detents, hooks, catches, clips or other docking inter-engagement elements, whose mechanical inter-engagement together effects the docking inter-engagement of the respective optical cell and the configuring element. Plural such pairs of mutually inter-engageable docking elements may be provided, if desired or appropriate, e.g. located on opposite sides of the respective optical cell and adjacent opposite sides of the respective mounting aperture in the configuring element, for enhancing the security and stability of the docking mounting of the respective optical cell on the configuring element.

Yet further alternatively still, the second attachment means may comprise one or more, especially a plurality of or one or more pairs of, snap-fit or click-in or other interconnection or docking or hooking or locking elements provided on the respective optical cell alone (or even on the configuring element alone), e.g. in a form of a sprung hook device which when pushed through an aperture in the configuring element, springs out and catches the edge of the aperture in a locking manner. Other types of such snap-fit or click-in or docking/hooking/locking devices or element may of course be possible.

If desired or necessary, in some embodiments of the optical cell, assembly or luminaire of the invention, secondary mounting means may be provided for mounting or securing or attaching the configuring element on or to a circuit board or wiring board, or a portion of either thereof, carrying the respective LED(s) (or other light source(s)) for association with the respective optical cell(s). Such secondary mounting means may take any of the same various forms as defined in (i), (ii) or (iii) hereinabove for the mounting means for mounting a light collector element of an optical cell on the circuit- or wiring board (or portion of either thereof). Alternatively any other suitable mounting means or device(s), e.g. screws, bolts or rivets that fix into corresponding holes, or an adhesive, may be used instead for the same purpose.

Thus, in any given such embodiment of the invention in its various aspects, especially those which relate to assemblies with light source(s) on circuit- or wiring board(s) and/or luminaires, the configuring element may comprise such secondary mounting means for the mounting or securing or attaching of the configuring element alone, or with one or more optical cells inserted or mounted in its/their respective aperture(s) therein, onto or to the circuit/wiring board(s) with the light source(s) mounted or pre-mounted thereon, and/or onto or to a body or frame of the luminaire, and/or any other parts of the luminaire. Such secondary mounting means may include, for example, any suitable number and arrangement of mounting holes in the board and/or the configuring element for attaching the configuring element to the board, for example, by screws, directly or through standoffs, or by snap-in, click-in or other inter-engagement features or components (e.g. pins, connectors, terminals, etc.) protruding from the configuring element and/or the board and which fit into and/or inter-engage with the mounting holes and thereby create a secure connection or attachment (e.g. by a friction fit, or interlocking mechanism) between the board and the configuring element.

In some embodiment optical cells or assemblies or luminaires within the scope of the various aspects of the invention, there may be included means for forming or creating one or more air gaps or spaces between two or more components of the assembly or luminaire once those components have been brought together in the forming of the assembly or luminaire. More particularly in various embodiments, for example, an optical cell or assembly or luminaire may include means for forming or creating one or more air gaps or spaces (or series of air gaps or spaces), e.g. of up to around 0.25 or 0.5 or 1 or 2 or 3 or 4 or 5 mm in depth or width, between any one or more of the following pairs of components thereof (where such components are actually provided in the relevant such embodiment optical cell or assembly or luminaire):

(i) an input side of the or each optical cell and the configuring element;

(ii) an input side of the or each optical cell and a circuit board or wiring board carrying the respective light source associated with that respective optical cell;

(iii) an input side of the or each optical cell and the respective light source associated with that respective optical cell;

(iv) one or more side walls of the or each optical cell and the respective light source associated with that respective optical cell;

(v) the configuring element and a circuit board or wiring board carrying the respective light source associated with that respective optical cell.

This provision of such air gap(s) or space(s) between various pairs of components in such various embodiments may be desirable in order to allow or promote air flow around the respective components and thereby help to dissipate or transfer away heat generated from the or each respective light source by convective air flow or even by forced air flow (e.g. using a fan included within the luminaire apparatus), and thus to help prevent or ameliorate a risk of overheating of the or the respective light source and/or the neighbouring/adjacent/surrounding component(s) of the optical cell or assembly or luminaire. Alternatively or additionally, the provision of such air gap(s) or space(s) may more simply be for the purpose of preventing the or each respective light source from being enclosed in a substantially air-tight space which could itself lead to overheating of the or the respective light source(s) and/or the neighbouring/adjacent/surrounding component(s) of the optical cell or assembly or luminaire.

Further alternatively or additionally, the provision of such air gap(s) or space(s) between, in particular, the configuring element and a circuit board or wiring board carrying the respective light source associated with that respective optical cell may also be desirable in order to allow the formation or creation of extra space in the assembly or luminaire arrangement for better accommodation of one or more other components which may be present on the respective circuit board or wiring board in addition to the respective light source(s) associated with the respective optical cell(s).

In some practical examples of various of the above embodiments including one or more air gaps or spaces between various pairs of components, the means for forming or creating the one or more air gaps/spaces may comprise one or more (or a plurality of) spacer elements or spacer members. In some such embodiments, the means for forming or creating the one or more air gaps/spaces may comprise one or more pins, spigots, ribs, protrusions, shoulders, flanges, collars, legs or other spacer elements or members provided on either one of, or each of, the components to be spaced apart to define the said respective air gap(s)/space(s). That/those spacer element(s)/member(s) may in certain embodiments be the same such element(s) as constitute the mounting means of type (i) defined hereinabove which act as spacer means for defining and setting a predetermined spacing distance between the circuit- or wiring board (or portion thereof) and a light collector element of the respective optical cell. In this latter case, therefore, such spacer means may serve the dual function of providing that mounting and spacing capability as well as creating the desired air gap(s)/space(s) between those two components of the arrangement.

If desired or necessary, in some embodiments of the arrangement or assembly or luminaire of the invention, tertiary mounting means may be provided for mounting or securing or attaching the configuring element to a luminaire body or frame, or any other part of the luminaire. Such tertiary mounting means may for example comprise any suitable number and arrangement of tabs or wings or extensions for e.g. sliding the configuring element into a corresponding number and arrangement of slot(s) or channel(s) in the luminaire body or frame (or other luminaire part), or any suitable number and arrangement of mounting holes or apertures (e.g. screw holes) for fastening the configuring element to the luminaire body or frame (or other part thereof). The outer shape of the configuring element (or the relevant portion thereof) may for instance be designed to fit into matching e.g. recess(es), notch(es), channel(s)/groove(s), etc in the luminaire body/frame (or other part thereof).

In addition to such tertiary mounting means, the configuring element may yet further also contain alignment or orientation means such as any suitable number and arrangement of notch(es), recess(es), channel(s)/groove(s), hole(s), aperture(s), tab(s), wing(s), extension(s), pin(s), leg(s), etc which match corresponding counterparts thereto (e.g. of any of the aforementioned types) on the circuit/wiring board and/or in or on the luminaire body or frame (or other part thereof) for enabling the configuring element to fit and be mounted securely into the luminaire and/or to be mounted on the circuit/wiring board in a desired orientation.

Any of the above tertiary mounting and/or alignment/orientation means features on the configuring element may, if desired or appropriate, be preformed into a specific shape. For example, one or more such tab(s), wing(s), extension(s), pin(s), leg(s), etc could be formed with or into a bent configuration so as to form a feature that is more readily or reliably directly mountable or attachable onto the relevant circuit/wiring board or luminaire body/frame (or other part thereof), as may be desired or appropriate to the design of the luminaire.

In some embodiment forms, each optical cell may be readily removable from its respective aperture in the configuring element, such as for the purpose of dismantling of the arrangement/assembly/luminaire for any reason or for the replacement or repair of any of its components. Alternatively, in other embodiment forms, each optical cell may be substantially non-removable from its respective aperture in the configuring element, i.e. it may be substantially permanently mounted therein.

In some embodiment forms, the configuring element may comprise a plurality of the said apertures, and the apertures may be arranged or mutually configured across the area of the configuring element, especially across at least a central region of the configuring element, in any suitable or desired pattern, distribution or geometric arrangement, such as for instance as may be dictated by the final desired arrangement of the various LEDs or other light sources in the various optical cells in the light-emitting area(s)/region(s) of the final complete luminaire's design. For example, the apertures in the configuring element may be spatially distributed across the configuring element (or across a central region thereof) in one or more linear, polygonal, rectangular, hexagonal, radial, circular, spiral, or even randomized arrangements. Generally however the exact spatial arrangement of the apertures may be dictated by the overall design of the finished complete luminaire.

Furthermore, in practising certain embodiments of the present invention in its various aspects which employ one or more pluralities of optical cells and thus one or more pluralities of light sources—both in the context of embodiments that may utilise a said configuring element and those which may not utilise such a configuring element—the plurality of light sources may be spatially and/or functionally arranged on one or more circuit boards or wiring boards (and thus also, if used, spatially and/or functionally arranged so as to be aligned with the respective apertures of a said configuring element) in a plurality of discrete groups, series, clusters or arrays. By "spatially arranged in a plurality of discrete groups/series/clusters/arrays" in this context is meant that one or more individual such groups, series, clusters or arrays of optical cells is/are located in a or a respective discrete section or region of the circuit or wiring board(s) (and/or configuring element) which is different from or spaced apart from the other section(s) or region(s) of the circuit or wiring board(s) (and/or configuring element) in which is/are located the other group(s), series, cluster(s) or array(s) of optical cells. By "functionally arranged in a plurality of discrete groups/series/clusters/arrays" in this context is meant that one or more individual such groups, series, clusters or arrays of optical cells is/are either (i) operable independently of one or more of the other groups, series, clusters or arrays of optical cells, and/or (ii) designed and/or constructed to exhibit different lighting characteristics and/or different optical functions from one or more of the other groups, series, clusters or arrays of optical cells. In embodiments designed with this "functional" independence between plural groups, series, clusters or arrays of optical cells, appropriate control over the individual optical cell groups', series', clusters' or arrays' operation may be effected by appropriate switching and/or electronic control means. By providing the various plural yet spatially and/or functionally discrete groups, series, clusters or arrays of optical cells in this manner, greater flexibility and variation in the overall optical functionality, lighting characteristics and aesthetics of the complete luminaire may be achievable, which may add to the overall design versatility of luminaires in accordance with embodiments of the present invention.

In embodiment luminaires in which a said configuring element is employed, in any given such embodiment the number of optical cells may be up to the same number as, or may be less than, the number of apertures in the configuring element. Thus, in some such embodiments, substantially all of the apertures in the configuring element may each have a respective optical cell received therein. However, in other such embodiments, it may be possible for one or more of the apertures in the configuring element to be empty and not have a respective optical cell received therein. Such latter embodiments may be particularly useful for example in the provision of certain designs of modular luminaires in the form of kits which may have enhanced versatility by virtue of the configuring element being made and provided in a single given design but is able to be combined with various different numbers of optical cells, so that a range of different complete luminaires may be constructable having a wider range of final designs or brightnesses or other lighting characteristics, whilst the number of different versions of the overall kit components is kept to a minimum.

Within the scope of this specification it is envisaged that the various aspects, embodiments, examples, features and alternatives, and in particular the individual constructional or operational features thereof, set out in the preceding paragraphs, in the claims and/or in the following description and accompanying drawings, may be taken independently or in any combination of any number of same. For example, individual features described in connection with one particular embodiment are applicable to all embodiments, unless expressly stated otherwise or such features are incompatible.

BRIEF DESCRIPTION OF THE DRAWINGS

Various embodiments of the present invention in its various aspects will now be described in detail, by way of example only, with reference to the accompanying drawings, in which:

FIG. 3(*b*) is an enlarged side-on sectional view of the arrangement of FIG. 3, showing more clearly the manner in which the light collector element of each optical cell is mounted in its respective aperture in the configuring element;

FIGS. 7(*c*) & 7(*d*) are, respectively, upper perspective and lower perspective view of an alternative design of a light collector element alone of the nature of a TIR solid body, more akin in general shape and configuration to the hollow-body version thereof shown in FIGS. 4 to 8 and 12 to 15 and usable in some alternative embodiments as a replacement therefor;

FIGS. 13(*b*), (*c*) & (d) are upper-perspective and lower-perspective views of, respectively, the light collector element, the transmission element, and the cover element of the modified embodiment optical cell of FIG. 13(*a*);

FIGS. 14(*b*), (*c*) & (d) are upper-perspective and lower-perspective views of, respectively, the light collector element, the transmission element, and the cover element of the modified embodiment optical cell of FIG. 14(*a*);

FIGS. 15(*b*), (*c*) & (d) are upper-perspective and lower-perspective views of, respectively, the light collector element, the transmission element, and the cover element of the modified embodiment optical cell of FIG. 15(*a*)

DETAILED DESCRIPTION OF EMBODIMENTS

Embodiments of the present invention provide a modular system of optical cells and optical cell components for use in constructing luminaires, and are based on the use of a modular set of optical cell components which are constructionally simple and cheap to mass-produce and deploy, and versatile in being able to form optical cells or optical modules that can be combined in any desired numbers and array configurations or layouts to form, together with appropriate LEDs-carrying circuit- or wiring board(s), luminaires of a wide range of sizes, shapes and designs.

Each optical cell or optical module may have associated with it—by virtue of having mounted or positioned therein or thereon or thereadjacent—one or more LEDs, and each optical cell's assemblage of optical components can represent or be assembled into individual optical cells each being designed and configured to redistribute light from each light source (LED), and from the light sources (LEDs) collectively, into a desired final output light distribution of the finished luminaire. Within luminaires according to embodiments of the invention, therefore, the optical cells can be spatially distributed according to the luminaire's design. They can form any type of regular or irregular arrangement, such as linear, rectangular, hexagonal, radial, randomized etc.

Figure 1:
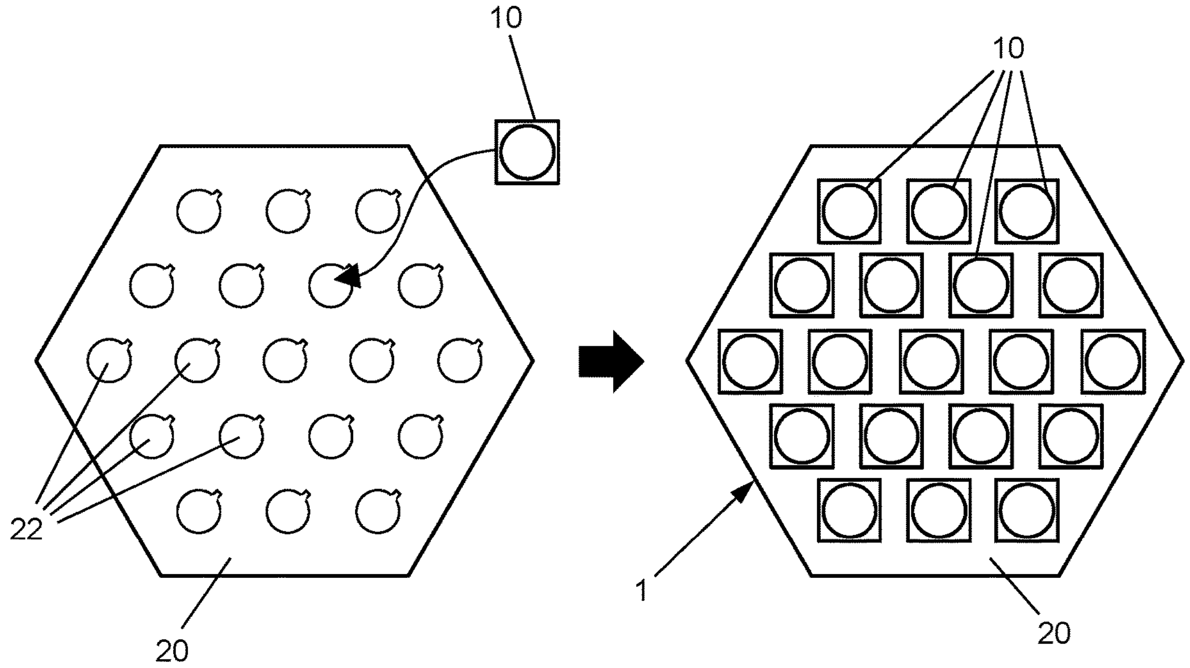
FIG. 1 is a plan view of an arrangement for forming into a luminaire, comprising an array of a plurality of optical cells each according to an embodiment of the invention, in which arrangement a hexagonal configuring element (as just one example of a possible polygonal shape thereof) is employed for accommodating the various optical cells of the array, in order to enhance the modular nature of the luminaire-building system.
Figure 2:
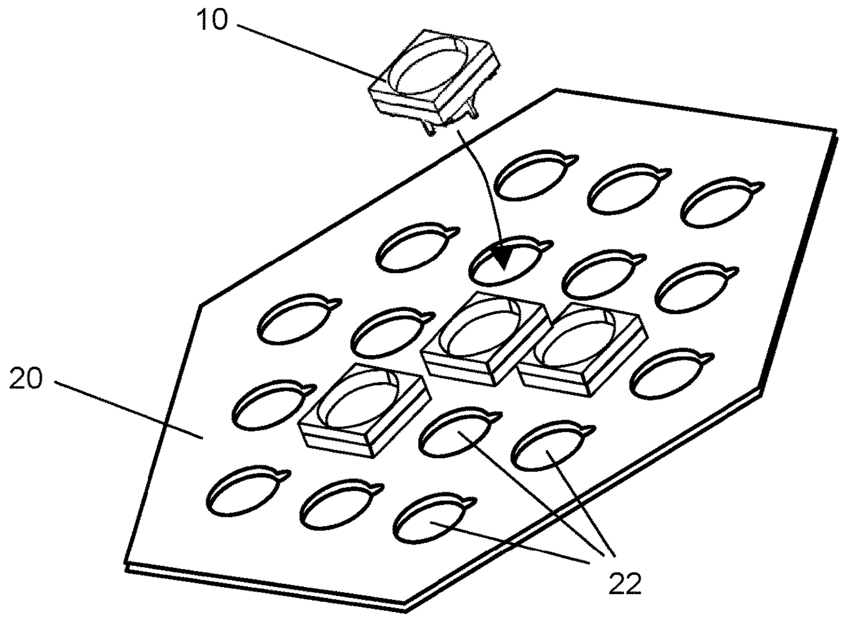
FIG. 2 is a perspective view of the arrangement of FIG. 1, in which the optical cells of the array are in the process of being inserted into the respective apertures in the configuring element.
Figure 3A:
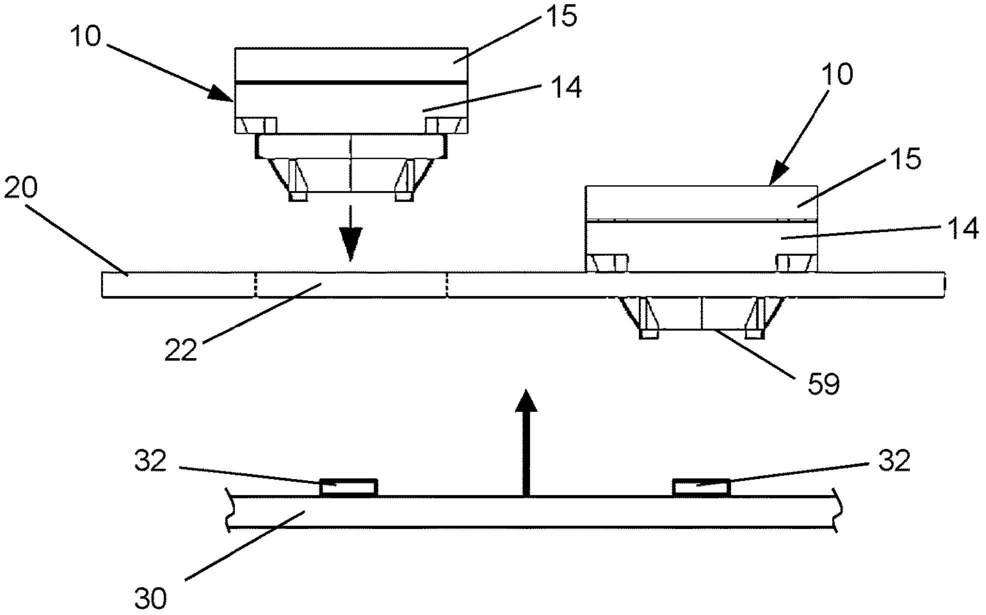
FIG. 3(*a*) is an enlarged side-on sectional view of part of the arrangement shown in FIGS. 1 & 2, showing the manner in which each optical cell is mounted in its respective aperture in the configuring element, and how a circuit board on which are pre-mounted the various LEDs is then brought together with the optical cells+configuring element arrangement in the formation of the complete luminaire.
Figure 3B:
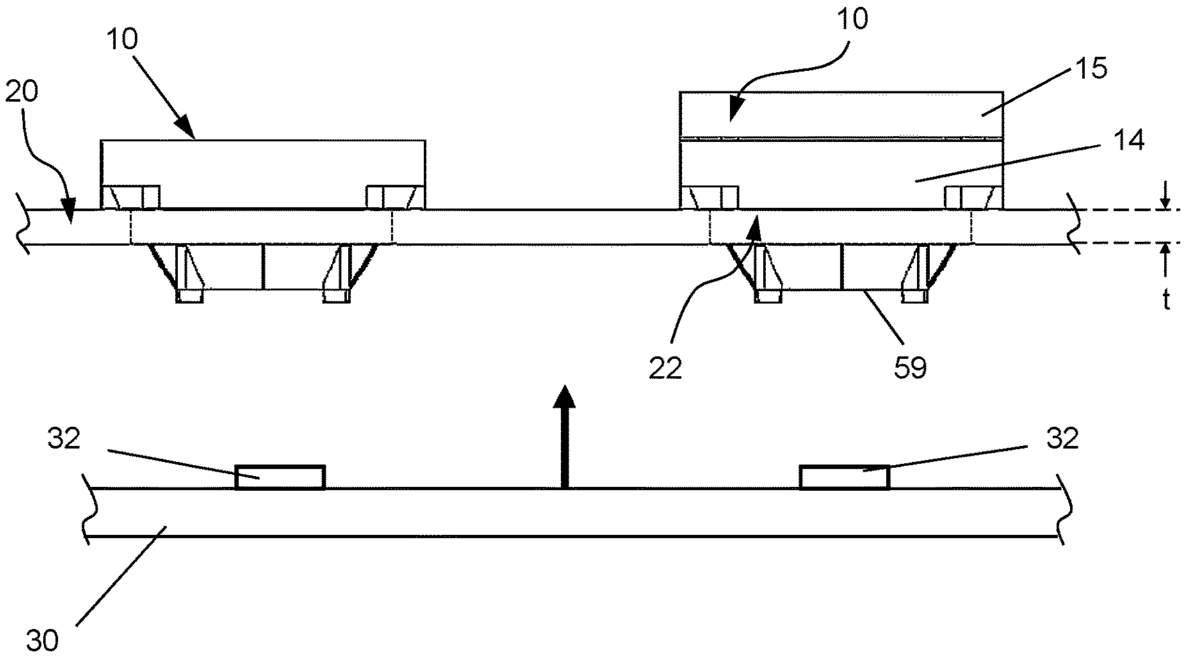

FIG. 1 shows an example embodiment arrangement 1 for forming into a luminaire, in which a hexagonal configuring element 20, e.g. die-cut from a flat sheet or plate (such as of a thickness t—see FIG. 3(*b*)—of around 1-2 mm) of a suitably strong and rigid plastics material, containing an array of optical cell-locating apertures 22 is employed for accommodating a symmetrical array of a large number of compact optical cells 10. Each optical cell 10 is an optical cell in accordance with any of various embodiments of the present invention. FIG. 2 shows those optical cells 10 in the process of being inserted into the respective apertures 22 in the configuring element 20, and fixed therein by appropriate means such as a simple friction fit, or gluing, or a click-in or snap-fit docking mechanism.

FIGS. 3(*a*) & 3(*b*) show more clearly and in greater detail the manner in which each optical cell 10 is mounted in its respective aperture 22 in the configuring element 20, and how a circuit board 30 on which are pre-mounted the various LEDs 32 is then brought together with the optical cells 10+configuring element 20 arrangement in the formation of the complete luminaire.

Figure 4:
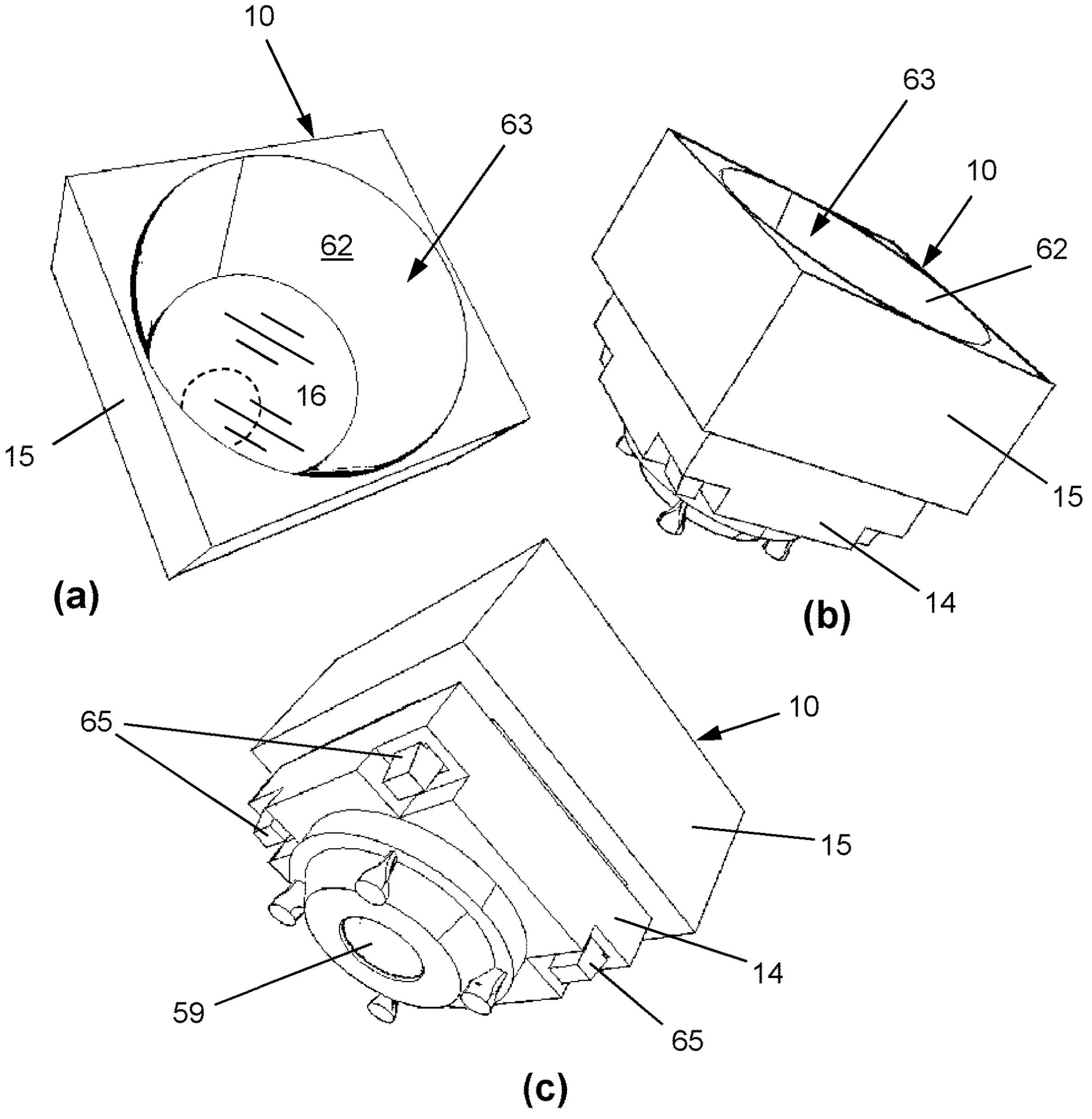
FIGS. 4(*a*), (*b*) & (c) are, respectively, upper-perspective, side-perspective and lower-perspective views of one complete optical cell according to an embodiment of the invention, which is used in FIGS. 1 to 3 to build up the array of optical cells for forming into the luminaire.
Figure 5:
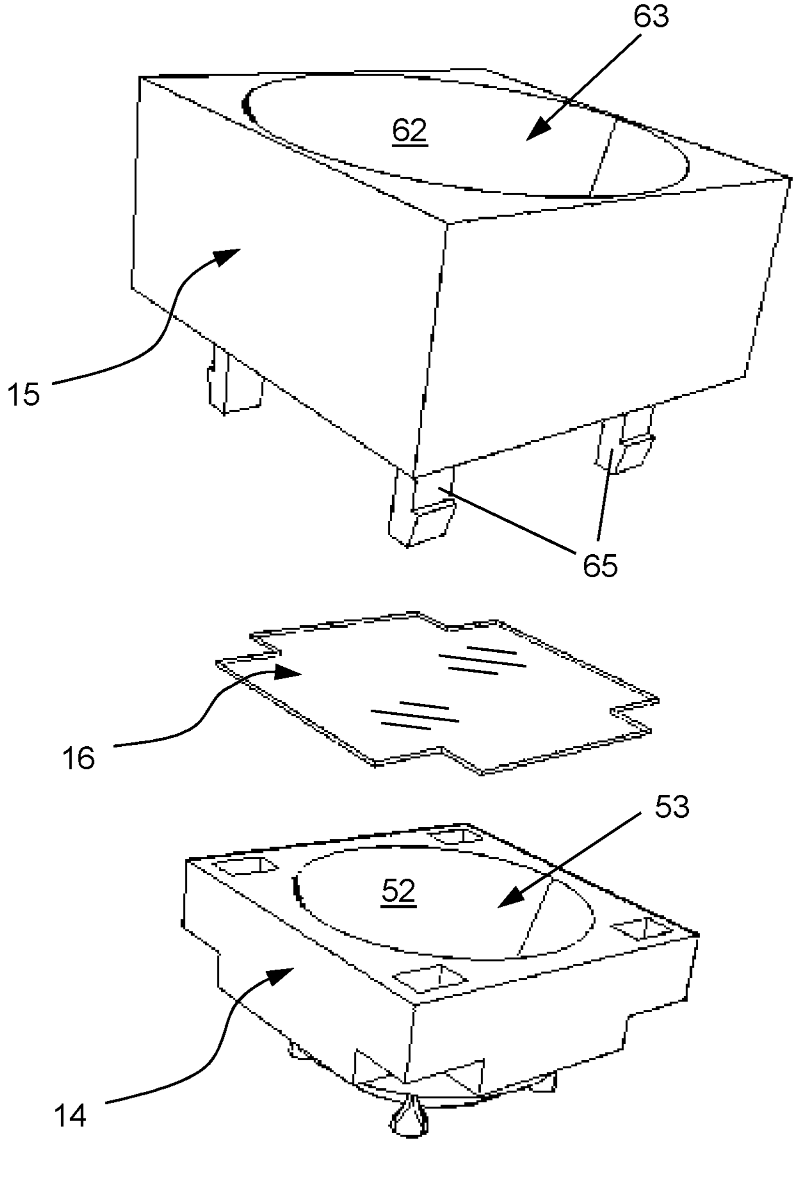
FIG. 5 is an exploded side-perspective view of the optical cell of FIG. 4, showing its constituent components.

As shown in FIGS. 3(*a*) & 3(*b*), but shown more clearly in FIGS. 4(*a*), 4(*b*) & 4(*c*) and FIG. 5 (the latter in exploded form), each optical cell 10 comprises a lower light collector element 14, an upper click-on cover element 15, and, mounted in a stable clamped manner therebetween, an optical transmission element 16.

Figure 6A:
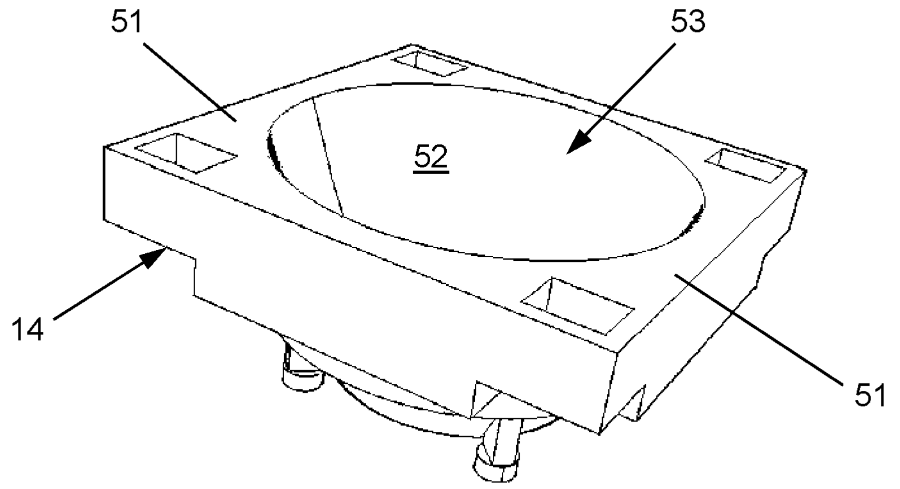
FIGS. 6(*a*) & (b) are, respectively, side-perspective and lower-perspective views of the light collector element alone of the optical cell of FIGS. 4 and 5.
Figure 6B:
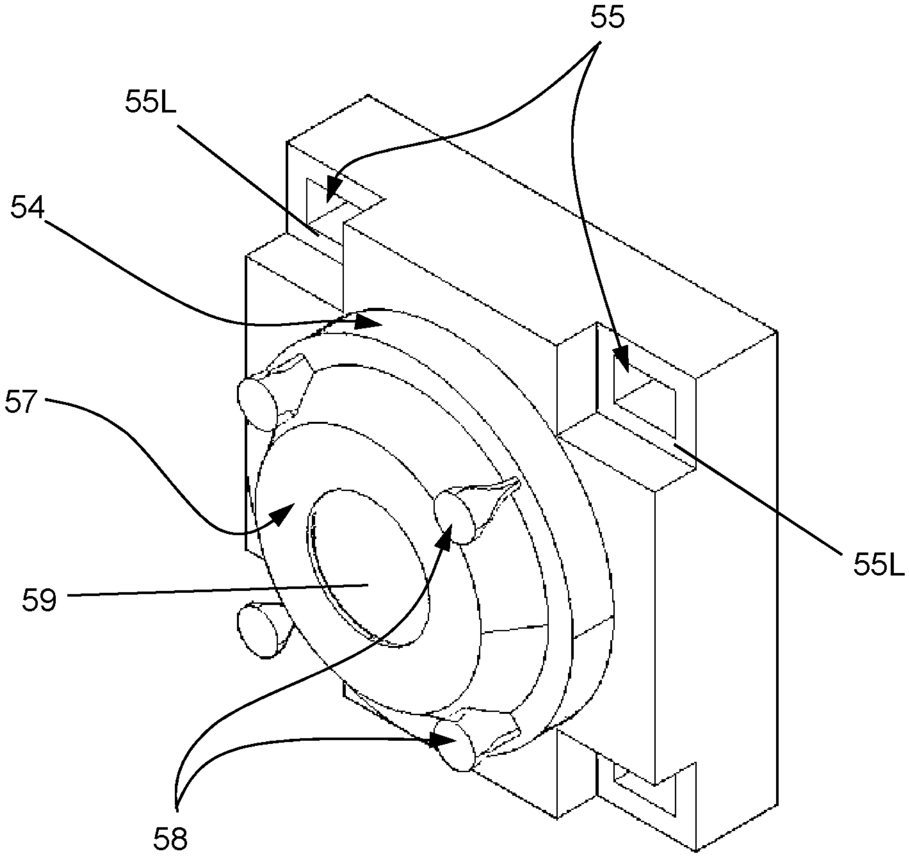
Figure 7A:
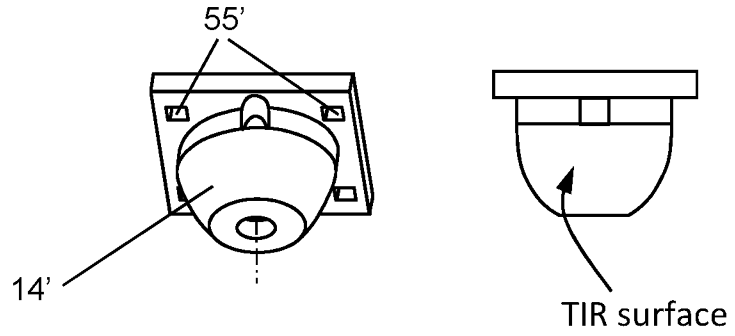
FIGS. 7(*a*) and 7(*b*) are, respectively, side-perspective & side views and cross-sectional views of an alternative form of light collector element alone, of the nature of a TIR solid body, which may be used in some alternative embodiments in place of the hollow-body form of light collector element shown in FIGS. 4 to 8 and 12 to 15.
Figure 7B:
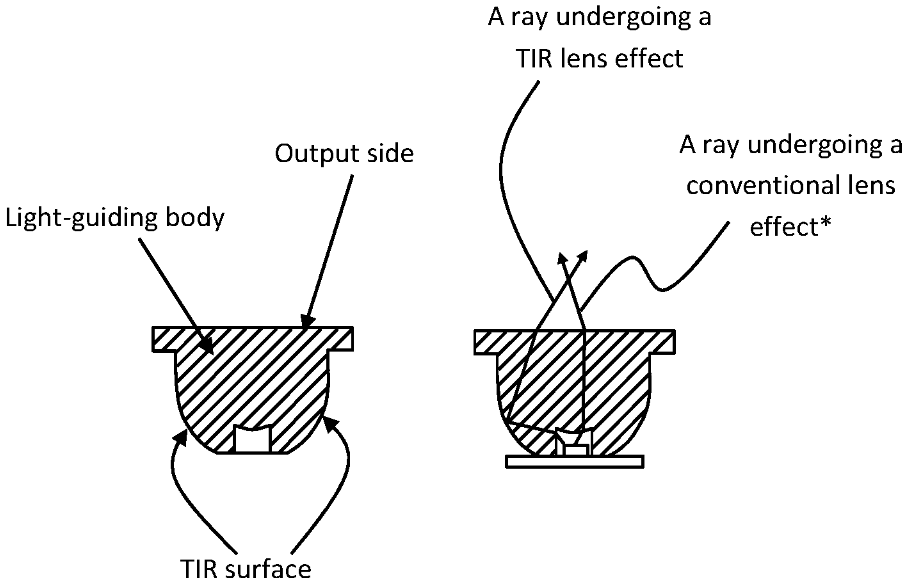
Figure 7C:
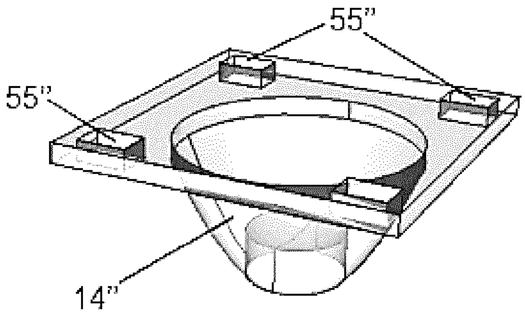
Figure 7D:
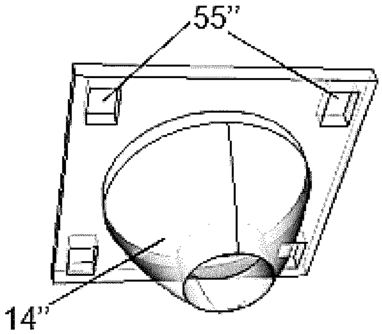

The light collector element 14 is shown more clearly alone in FIGS. 6(*a*) & (b). The light collector element 14 is in the form of an injection-moulded hollow body or container of e.g. a polycarbonate (or other suitably strong and rigid polymeric material), and its internal walls 52 define a circular-transverse-sectioned frusto-conical void or chamber 53 therewithin which is accessible from beneath via a lower hole or aperture 59 through which can protrude a respective LED 32 provided pre-mounted on a circuit board or wiring board 30. A lower portion of the light collector element 14 includes a generally cylindrical outer surface portion 54 for enabling the light collector element 14's friction-fit into the respective aperture 22 in the configuring element 20 used to form the luminaire. It also includes at least one suitably sized, shaped and positioned contact land, seating element or portion, or mounting surface 57 via which the light collector element 14 can be adhered to the circuit- or wiring board 30, e.g. by use of a suitable adhesive (examples of which are well-known in the art and widely commercially available). The top planar wall portions 51 (FIG. 6(*a*)) of the light collector element 14 serve as support means for stably and securely supporting the transmission element 16 in the finally assembled optical cell 10.

The internal walls 52 of the frusto-conical chamber 53 within the hollow-body light collector element 14 are formed with a light-reflecting and/or light-collimating coating of vacuum-deposited aluminium (or other suitable light-reflective material), for collecting and redirecting—by reflecting and/or collimating—the light emitted from the respective LED 32 contained in that optical cell 10 and directing or redirecting it towards the optical cell's transmission element 16, and from there onwards towards the optical cell's light output (i.e. which in practice is the upper output opening or mouth of the optical cell's cover element 15).

Figure 13:
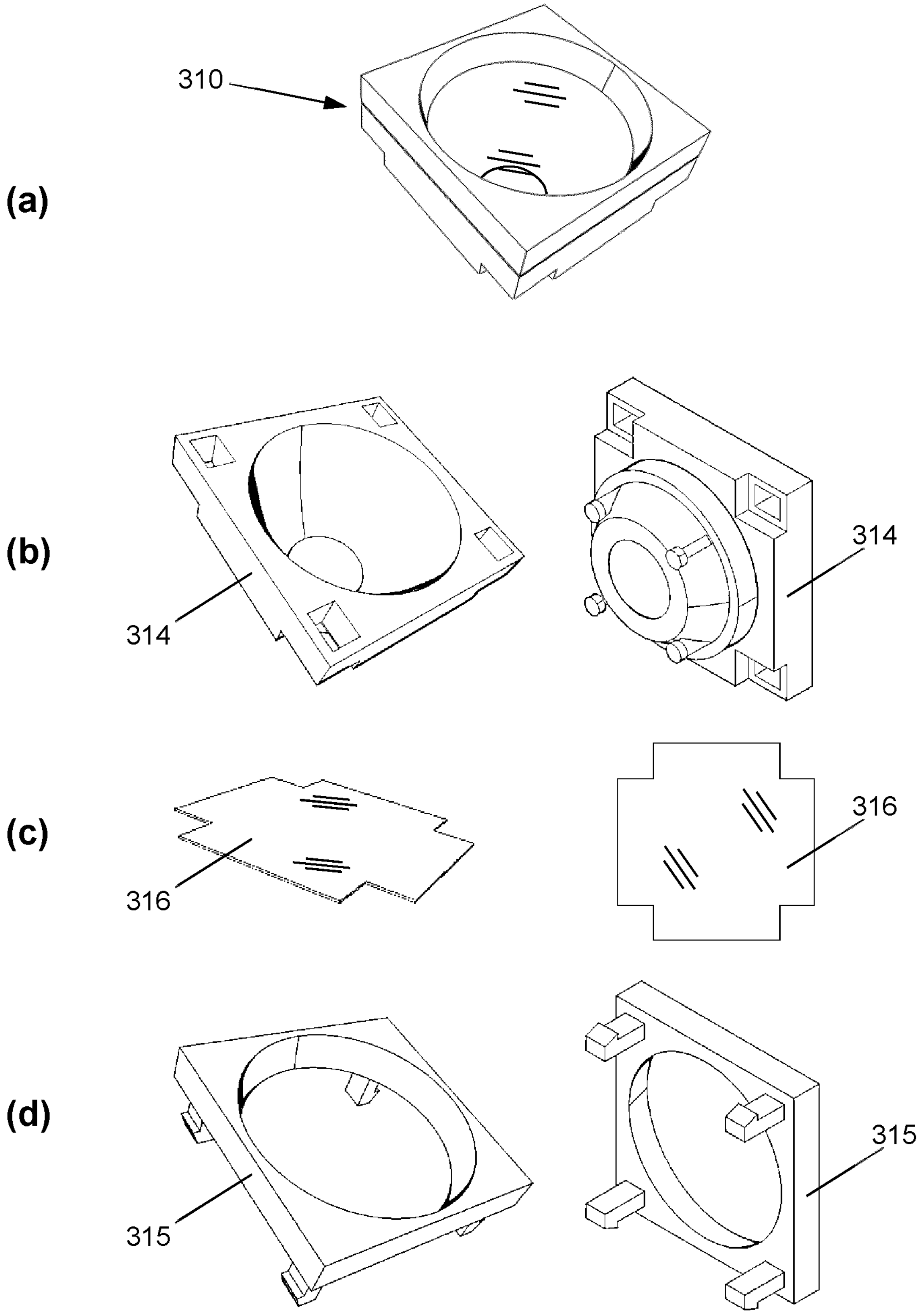
FIG. 13(*a*) is an upper-perspective view of a yet further alternative embodiment of optical cell in accordance with the invention, in which the general basic shape (in plan) of the optical cell is circular.
Figure 14:
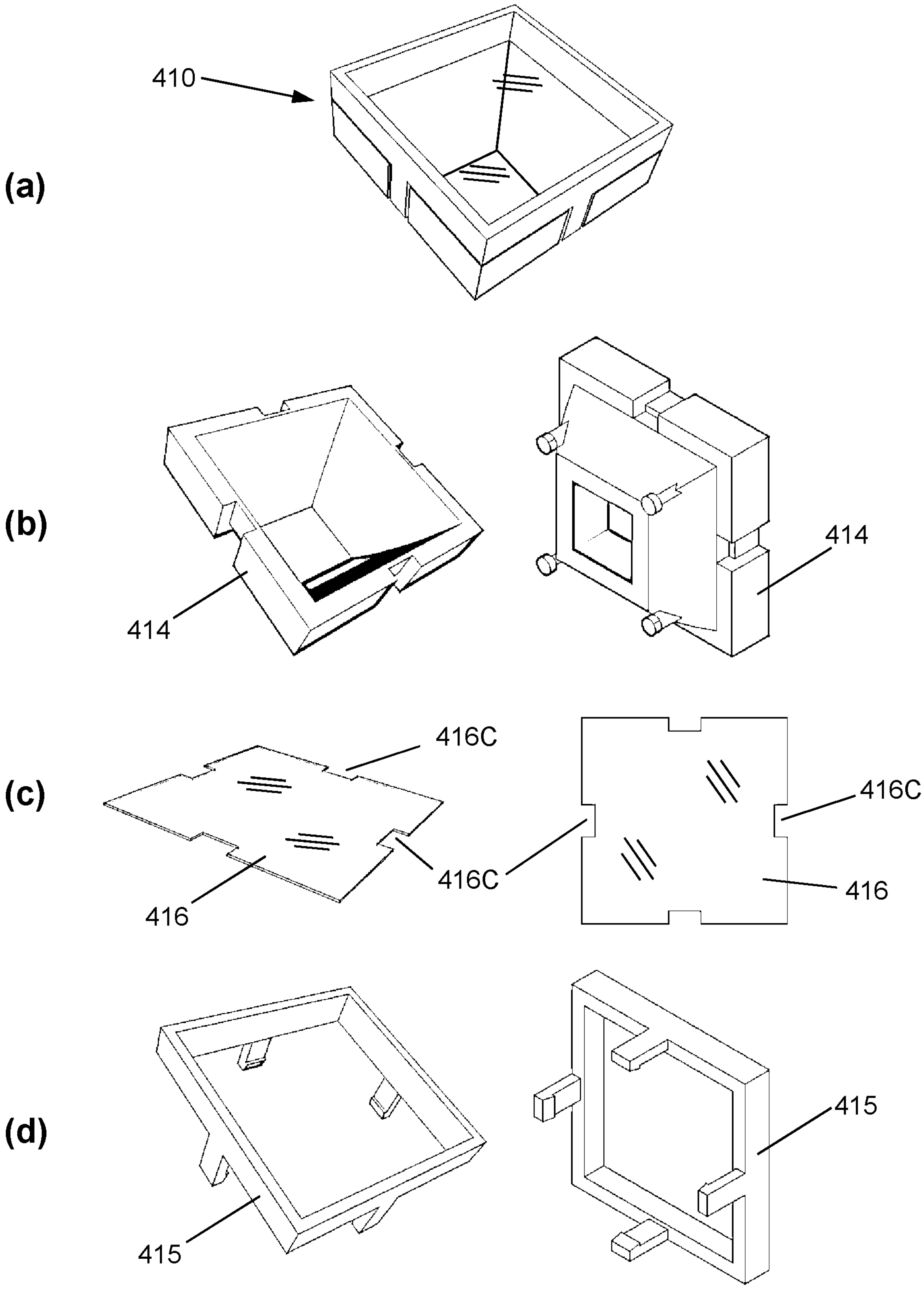
FIG. 14(*a*) is an upper-perspective view of a yet further alternative embodiment of optical cell in accordance with the invention, in which the general basic shape (in plan) of the optical cell is square.
Figure 15:
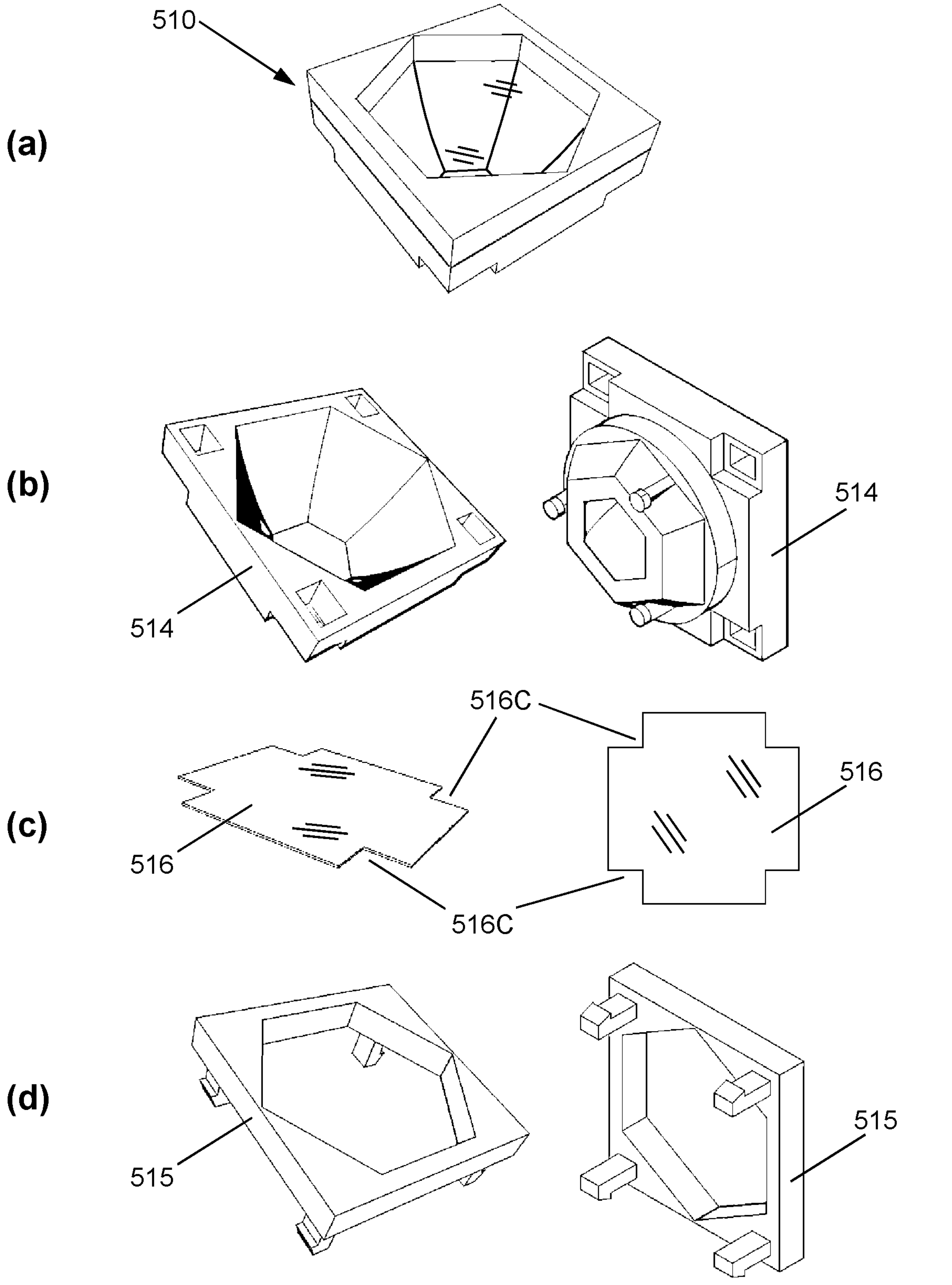
FIG. 15(*a*) is an upper-perspective view of a yet further alternative embodiment of optical cell in accordance with the invention, in which the general basic shape (in plan) of the optical cell is hexagonal.

Although the hollow light collector element 14 of this embodiment is shown here as being circular in transverse cross-section, with its internal chamber 53 being frusto-conical, like the alternative light collector element 314 shown in FIG. 13(*b*), other alternative cross-sectional and/or three-dimensional shapes of the internal chamber 53 within the light collector element 14 are possible in other embodiments: for example an inverted-pyramidal chamber that in cross-section is square, as shown for the alternative light collector element 414 in FIG. 14(*b*); or hexagonal, as shown for the alternative light collector element 514 in FIG. 15(*b*).

In addition to the one or more mounting surface(s) 57 (via which the light collector element 14 can be adhered to the circuit- or wiring board 30), the light collector element 14 further includes additional mechanical attachment means in the form of two pairs of mounting pins or spigots 58, which not only provide a more secure means of mounting the light collector element 14 on the circuit- or wiring board 30, but also serve to align it into its correct position and orientation upon it being mounted on the circuit- or wiring board 30. The mounting pins or spigots 58 also inherently act as spacers for defining and setting a predetermined spacing distance between the circuit- or wiring board 30 and the light collector element 14 once the latter has been mounted thereon.

Figure 10:
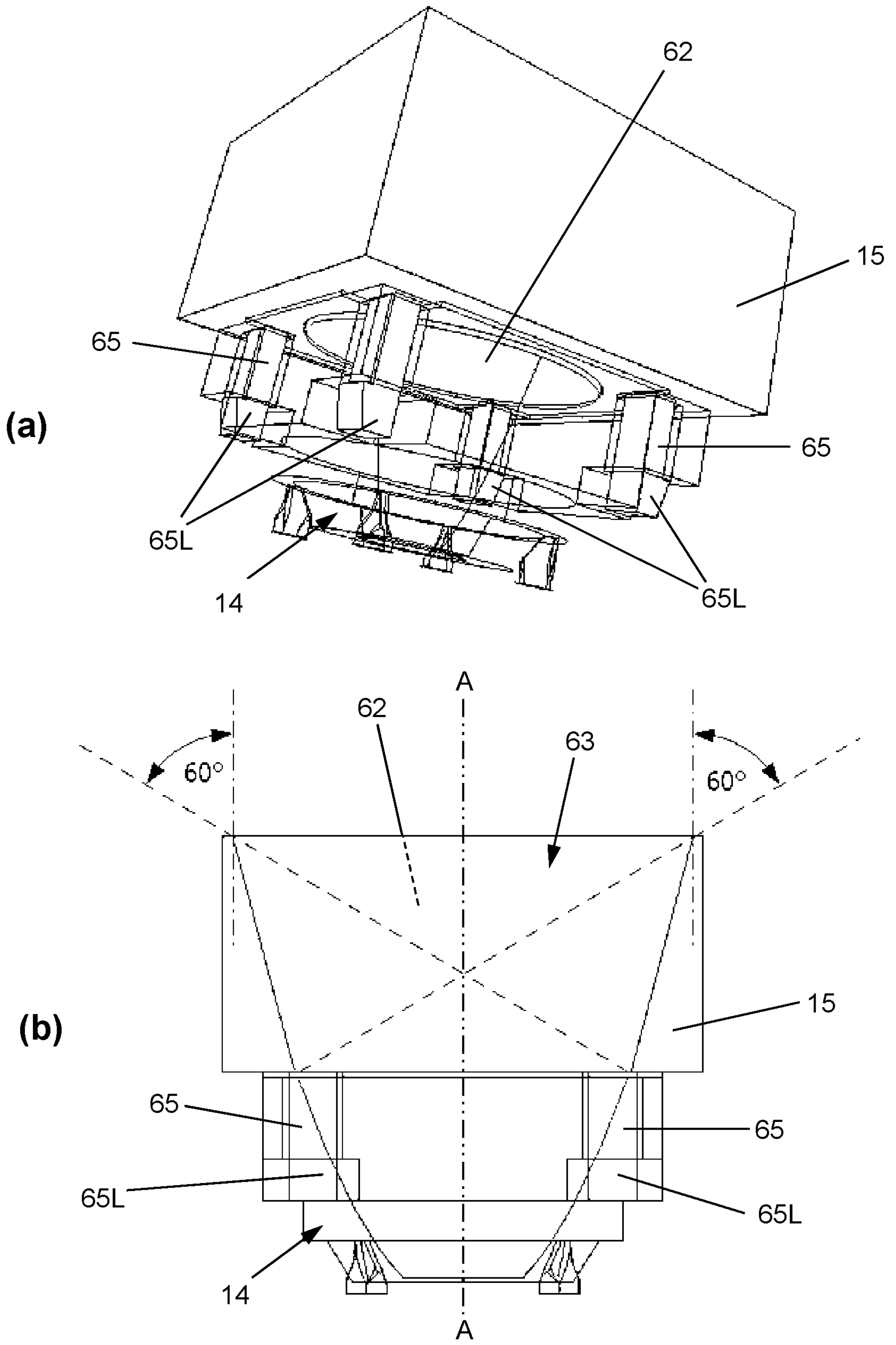
FIG. 10(*a*) is a side-perspective view of the cover element alone of the optical cell of FIGS. 4 and 5, and FIG. 10(*b*) is a side-elevational cut-away view showing in clearer detail the positioning of the cover element relative to the other components of the overall optical cell assembly.

The light collector element 14 further includes an appropriate number of locating holes or apertures 55 formed in an upper wall or attachment portion thereof, into which are locatable in an inter-engageable snap-fit or click-in fashion a corresponding number and spatial arrangement of elongate legs 65 extending from a lower wall or attachment portion of the cover element 15 (as shown more clearly in FIG. 10). Each of the legs 65 includes a respective lower locking or engagement detent, step, notch, hook or catch element 65L, and each of the holes/apertures 55 in the light collector element 14 includes a respective locking seating, recess, edge, abutment surface or catch feature 55L, for forming the respective inter-engagement snap-fit/click-in attachment feature of the light collector and cover elements 14, 15.

The light collector element 14 shown in the drawings so far is of the hollow-body species, with sidewalls that form an internal chamber therewithin for collecting and conveying light therethrough. However, as an alternative to such a hollow-body species type of light collector element, a solid-body species type may be used instead—one example of which is shown in FIGS. 7(*a*) and (*b*). Such an alternative form of light collector element 14' relies on TIR (total internal reflection) phenomena at one or more of its external surfaces to perform the necessary task of directing or redirecting light (or a portion of the light) passing through the solid body from its input surface or side to its output surface or side.

The body of the light collector element 14' comprises a suitably shaped and configured substantially solid body of light-permeable or light-transparent or light-transmissible material, e.g. various plastics materials, such as polycarbonate (PC), polymethylmethacrylate (PMMA), polyethylene terephthalate (PET), or a glass. The body's external walls are shaped or configured in any suitable or appropriate manner (or combination of manners in different portions thereof) which effects the desired TIR (total internal reflection) phenomena which at least in part serve to redirect and/or guide light, or a portion of the light, that has entered the body towards the body's output surface/side. Suitable such exterior shapes of any one or more of, or one or more portions of, the TIR solid body side wall(s) may include, for example: conical, part-conical or frusto-conical, paraboloidal, hyperboloidal, cylindrical, pyramidal (especially inverted pyramidal) with any number of sides from 3 upwards (e.g. a pyramid with from 3 to 6 or 7 or 8 sides), or circular or elliptical or polygonal in horizontal or transverse cross-section, or with side wall(s) or one or more portions of one or more side walls being either substantially planar or alternatively curved or arcuate in shape moving from the body's input surface to its output surface with a curve function defined by any suitable/appropriate geometric curve function, especially a curve function that provides the TIR capability. As with the hollow-body version of light collector element 14 shown in the other FIGS., the alternative TIR-based solid body light collector element 14' shown here likewise includes, inter alia, locating holes or apertures 55' formed in an upper wall or attachment portion thereof, into which are locatable in an inter-engageable manner corresponding snap-fit or click-in locking or attachment legs from the relevant cover element of the respective optical cell.

The form and optical behavior of the solid-body TIR-based light collector element 14' are illustrated by way of self-explanatory example in FIG. 7(*b*).

FIGS. 7(*c*) & 7(*d*) show an alternative design of a TIR-based solid body light collector element 14" alone, which is more akin in general shape and configuration to the hollow-body version thereof shown in FIGS. 4 to 8 and 12 to 15 and usable in some alternative embodiments as a replacement therefor.

Figure 8A:
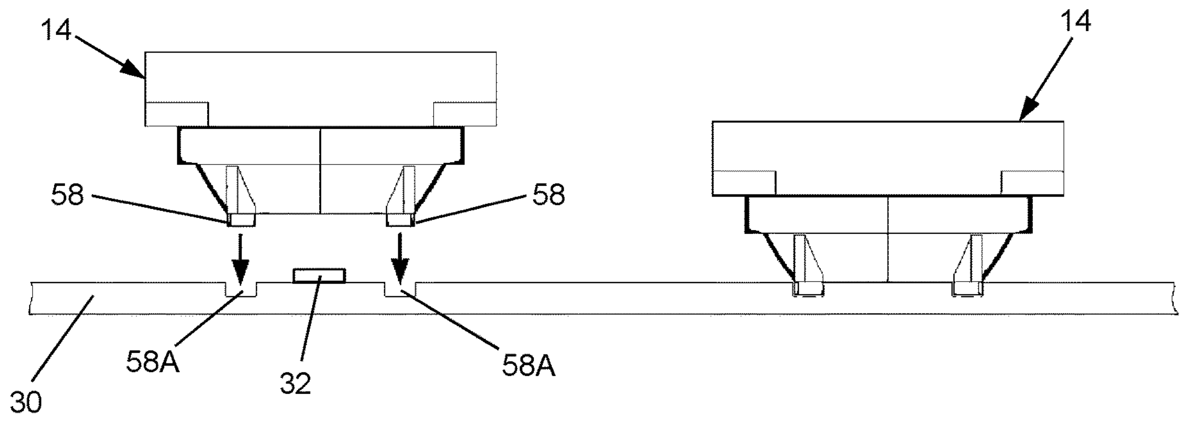
FIGS. 8(*a*), (*b*) & (c) are side views of three different techniques by which the light collector element of FIGS. 6(*a*) & (b) may be mounted on a LED-carrying circuit board or wiring board.
Figure 8B:
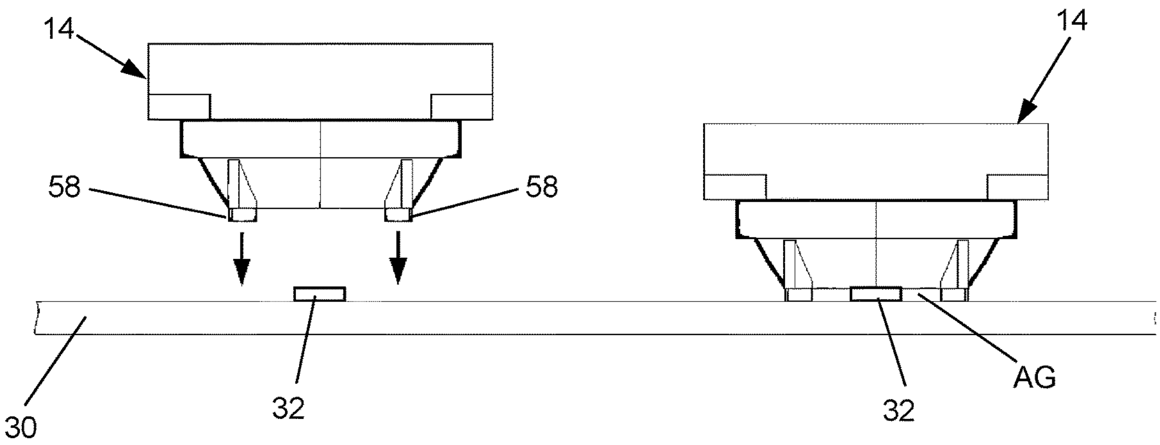
Figure 8C:
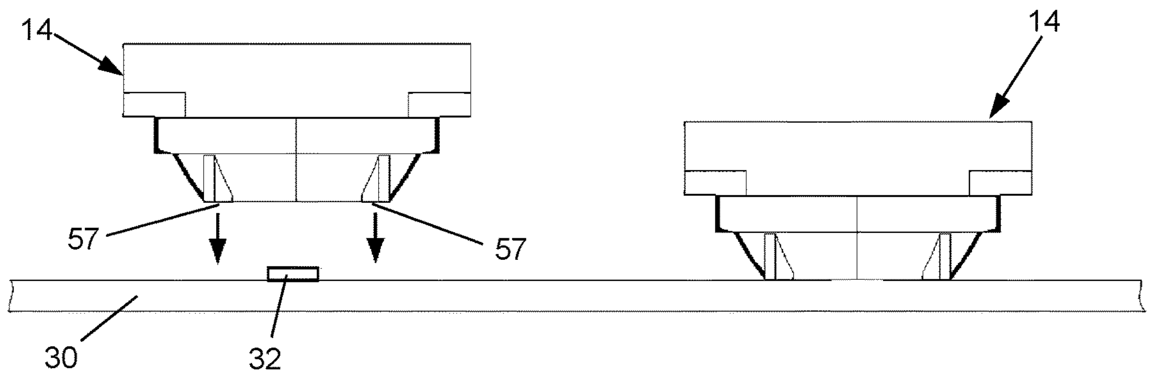

FIGS. 8(*a*), 8(*b*) & 8(*c*) show three different techniques by which the light collector element 14 of FIGS. 6(*a*) & (b) of each given optical cell 10 may be mounted on the LED-carrying circuit- or wiring board 30. For example:

- As shown in the technique of FIG. 8(*a*), the pins/spigots 58 fit snugly into corresponding holes, apertures or recesses 58A in the upper surface of the circuit- or wiring board 30, and they may optionally be glued therein, and they thereby act primarily as alignment features to ensure the correct positioning and alignment of the light collector element 14 at its mounting site on the board 30;
- As shown in the technique of FIG. 8(*b*), here the apertures or recesses 58A in the upper surface of the board 30 are omitted, and instead the pins/spigots 58 are glued directly to the upper surface of the board 30, and they thereby act primarily as spacers to define the correct spacing between the light collector element 14 and the board 30 once they have been mounted together;
- As shown in the technique of FIG. 8(*c*), here the pins/spigots 58 have been chopped or cut off, so are omitted altogether, and instead the light collector element 14 is glued onto the upper surface of the board 30 via its remnant back mounting surface(s) 57.

FIG. 8(*b*) also illustrates by way of example one way in which the arrangement may be designed so as to include an air gap AG (e.g. of up to about 0.5 or 1 or 2 or 3 mm in depth) formed or created between the lower (i.e. input) side of each optical cell 10 and the circuit- or wiring board 30 on which the respective LED 32 is mounted. In this particular illustrated case, the air gap AG is formed by virtue of the one or more pairs of spacer members 58, which are provided on the lower face of the optical cell's light collector element 14, in the form of legs, pins, legs, or spigots 58, which simultaneously also act as mounting means of type (i) defined hereinabove which act as spacer means for defining and setting a predetermined spacing distance between the circuit- or wiring board 30 and the light collector element 14 of the respective optical cell 10. The provision of this air gap AG helps promote air flow around the components of the arrangement, thereby helping to dissipate heat generated from the respective LED 32 by convective air flow or even by forced air flow (e.g. using a fan included within the overall luminaire apparatus), and thus to help prevent or ameliorate a risk of overheating of the respective LED 32 and/or the neighbouring/adjacent/surrounding components of the optical cell or assembly or luminaire. The provision of the air gap AG also helps to prevent the respective LED 32 from being enclosed in a substantially air-tight space which could itself lead to overheating of same and/or the neighbouring/adjacent/surrounding components.

Figure 9:
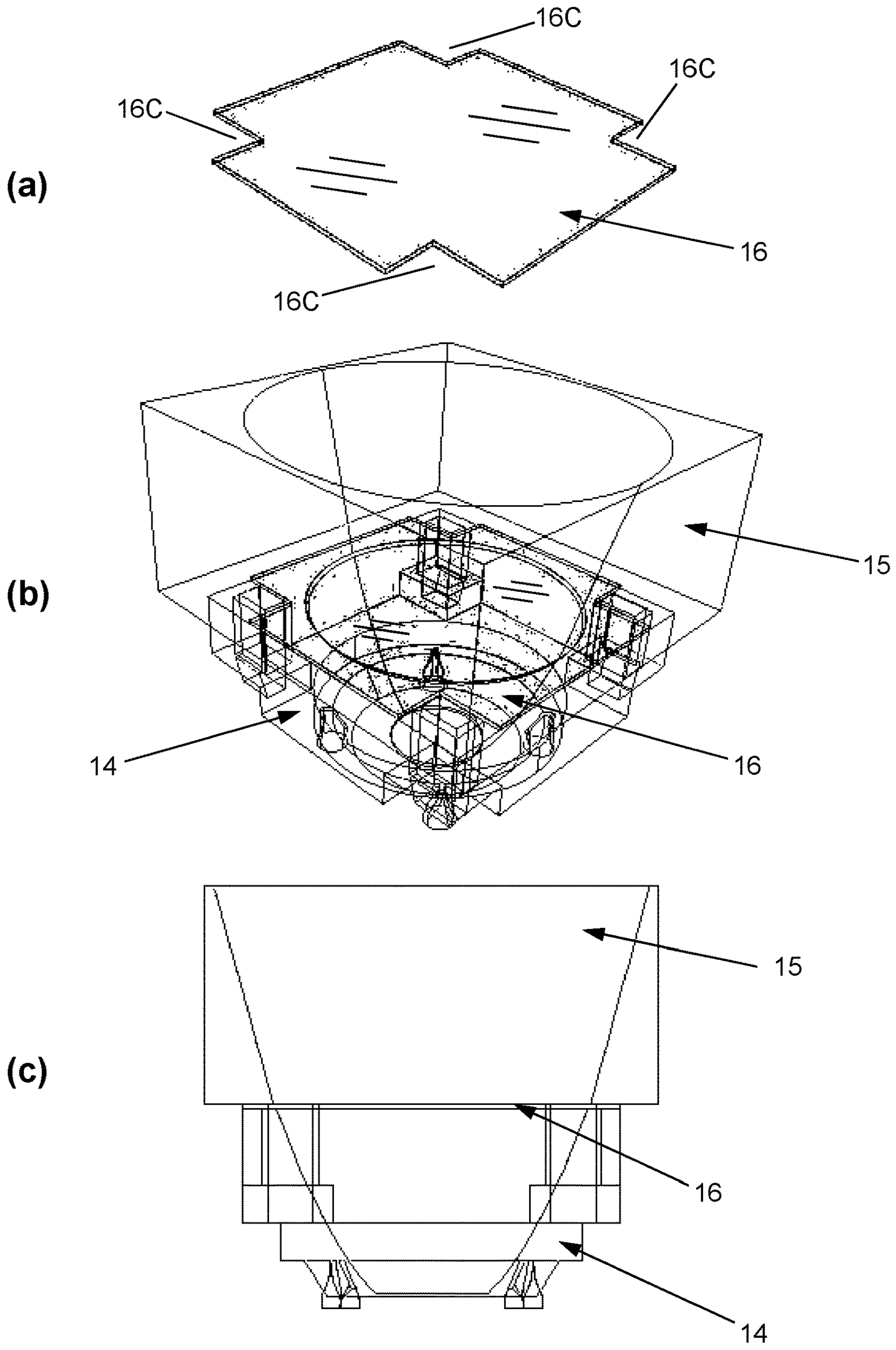
FIG. 9(*a*) is a side-perspective view of the transmission element alone of the optical cell of FIGS. 4 and 5, and FIGS. 9(*b*) & (c) are, respectively, side-perspective and side elevational cut-away views showing in clearer detail the positioning of the transmission element in the overall optical cell assembly.

FIGS. 9(*a*), 9(*b*) & 9(*c*) show more clearly the transmission element 16 and its positioning, relative to the light collector element 14 and cover element 16, in the complete assembled optical cell 10. The transmission element 16 comprises a light-transmissible flat, planar foil, film, sheet, web, plate, layer or other thin planar body of optical material exhibiting a desired optical function. It may be formed, e.g. die-cut, for example from a foil or film substrate of polycarbonate (or other suitable polymer, or perhaps even a metal or metal alloy), e.g. of a thickness of around 250 μm. The optical function of the transmission element 16 may be any optical function which effects or facilitates a desired distribution and/or one or more output characteristics of light emanating from the respective optical cell 10, such as by modifying or modulating one or more optical properties (especially directional optical properties) of the light emitted by the respective LED 32 as determined by the optical function of the transmission element 16 of that optical cell 10.

Typically at least one major surface or face, optionally both major surfaces or faces, of the transmission element 16 is/are formed with optical functional relief, especially optical functional relief of a nanometer(s) order of size, and more especially nano-relief which displays either diffractive or refractive behaviour, or a combination of diffractive and refractive behavior. Suitable sizes of the surface relief features may for example be in the range of from about 0.5 or 1 up to about 500 nm, e.g. from about 1 or 2 or 3 up to about 10 or 20 or 50 or 100 or 250 nm.

Specific examples of surface nano-scale optical functional relief, and techniques for how to create or apply it to a variety of optical substrate materials—such as various embossing processes—are all widely known in the art of optics and holographics, and will be within the general skill and knowledge of the skilled person.

If desired or appropriate, the transmission element 16 may be cut or shaped to include any suitable number of peripheral indents, notches, recesses, channels, or cut-outs 16C (as illustrated in FIG. 9), for the purpose of accommodating and allowing to extend therepast the snap-fit attachment legs 65 of the cover element 15. Although the transmission element 16 of this embodiment is shown here in FIG. 9 as having one configuration of such peripheral indents, notches or cut-outs 16C as also appears in the alternative optical cell's transmission element 316 shown in FIG. 13(*c*), other alternative configurations of such peripheral indents, notches or cut-outs 16C are possible in other embodiments: for example those differently positioned and shaped peripheral indents, notches or cut-outs 416C as shown for the alternative transmission element 416 in FIG. 14(*c*) or the further alternatively shaped peripheral indents, notches or cut-outs 516C as shown for the further alternative transmission element 516 in FIG. 15(*c*).

FIGS. 10(*a*) & 10(*b*) show more clearly the cover element 15 and its positioning, relative to the light collector element 14, in the complete assembled cell 10. The cover element 15 comprises an injection-moulded casing, surround or body 15, e.g. of a polycarbonate, with internal surfaces 62 that define a circular-transverse-sectioned frusto-conical interior cavity 63 therewithin. The cavity's defining internal surfaces 62 are contiguous with, i.e. are a continuation of, the interior walls 52 of the upper region of the internal chamber 53 within the light collector element 14. As already mentioned, extending from the lower wall portion of the cover element 15 are snap-fit or click-in attachment legs 65, which are used to unite the cover element 15 with the light collector element 14.

The cover element 15 also includes an anti-glare feature, which is formed by its internal surfaces 62 having an extended height or upward length—e.g. a height at least that of the height of the light collector element 14 or of the distance between the respective LED 32 of that optical cell and a base of the cover element 15 when the optical cell 10 is fully assembled (or a height up to about 1.5 or 2 or 2.5 or even as much as 3 times the height of the light collector element 14 or of the distance between the respective LED 32 of that optical cell and a base of the cover element 15 when the optical cell 10 is fully assembled)—and being configured so as to be sloped or inclined at an angle, relative to a central axis A (FIG. 10(*b*)) of the optical cell 10 (i.e. an axis A perpendicular or normal to a plane of the circuit- or wiring board 30 upon which the optical cell 10 is to be mounted) of >0°, especially in the region of around 20 to 30°. As a result of this inclined or sloping configuring of the heightened internal surfaces 62 of the cover element 15, light rays emanating from the LED 32 in that optical cell and being directed towards the optical cell's output opening at an exit angle beyond a certain minimum angle value—which in this illustrated example is a minimum exit angle of around 60°—can be blocked, cut out or (at least partially) absorbed by the cover element 15's wall material and thereby prevented from exiting the optical cell 10 and causing unwanted glare.

It may be possible, in some alternative embodiment implementations of kits according to the invention, to provide a plurality of differently configured cover elements 15 for selective use singly with a single given light collector element 14 and transmission element 16 of a given optical cell 10, wherein each differently configured cover element 15 has a different angle of slope or inclination of its internal surfaces 62 and thus a different degree of anti-glare properties in terms of the light ray exit angle beyond which the exiting light rays are blocked. Such plural cover elements 15, per single given light collector and transmission elements 14, 16, may thus enhance the modular versatility of some embodiment kits within the scope of this aspect of the invention.

Although the interior cavity 63 within the cover element 15 of this embodiment is shown here in FIG. 10 as being circular in transverse cross-section and thus generally frusto-conical in three-dimensional shape, like the alternative cover element 315 shown in FIG. 13(*d*), other alternative cross-sectional and/or three-dimensional shapes of the internal cavity 63 within the cover element 15 are possible in other embodiments: for example an inverted-pyramidal cavity that in cross-section is square, as shown for the alternative cover element 415 in FIG. 14(*d*); or hexagonal, as shown for the alternative cover element 515 in FIG. 15(*d*).

Figure 11:
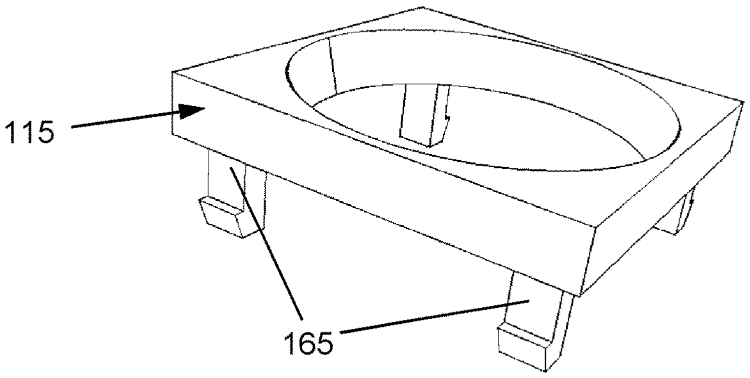
FIG. 11 is a side-perspective view of an alternative form of cover element, for use in another embodiment of the invention.

FIG. 11 shows an alternative form of cover element 115, for use in an alternative embodiment optical cell of the invention, which alternative cover element 115 is of a more basic construction and has the anti-glare sloped/inclined walls feature omitted.

Figure 12:
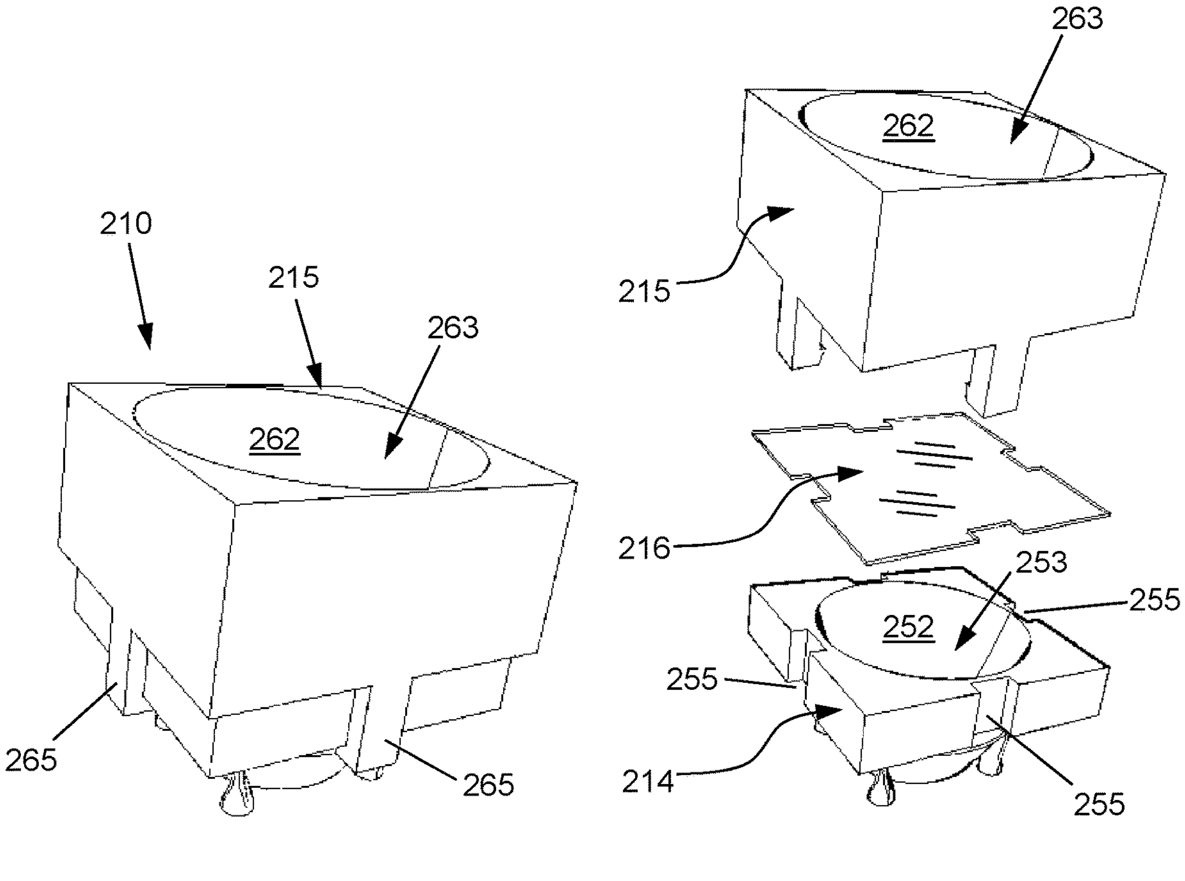
FIGS. 12(*a*) & (b) are, respectively, side-perspective and exploded views of a further alternative embodiment of optical cell, in which the constructions of certain parts of the light collector element and the cover element have been modified, and the configuration of the transmission element has been modified, whereby the components of the optical cell are securable together in a modified way, in comparison with those of the cell of FIGS. 4-10.

FIGS. 12(*a*) & 12(*b*) show a further alternative embodiment of optical cell 210 (where corresponding reference numerals are used to identify corresponding features already discussed in relation to preceding embodiments based on the same basic reference numeral but incremented by 100). Here, the peripheral positioning and orientation of the various snap-fit or click-in legs 265 on the cover element 216 have been modified, as shown in these FIGS., and the corresponding locating holes/apertures 255 with which they inter-engage to attach and fasten the light collector element 214 and cover element 215 together are now in the form of peripheral recesses, channels or cut-outs 255, as also shown in these FIGS.

Figure 16:
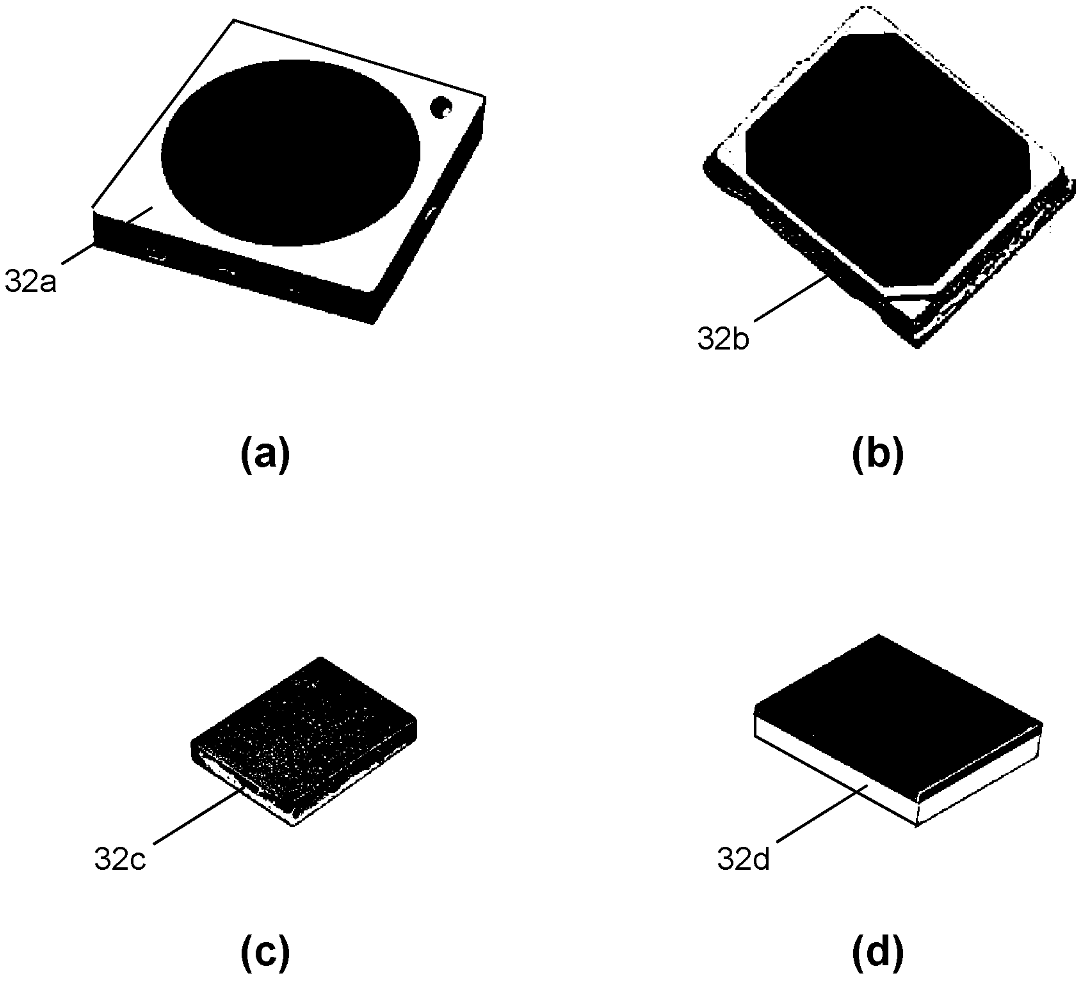
FIGS. 16(*a*), (*b*), (*c*) & (d) are perspective views of four different types of LED chips, which may be used as any of the light sources in any of the illustrated, or even other, embodiments of the invention.

FIGS. 16(*a*), (*b*), (*c*) & (d) are perspective views of four different types of LED chips, which may be used as any of the light sources 32 in any embodiments of the invention. By way of example, the two LED chips 32*a* & 32*b* shown in FIGS. 16(*a*) & (b) may be, respectively, the 3030 and 2835 LED packages from OSRAM, and the two LED chips 32*c* & 32*d* shown in FIGS. 16(*c*) & (d) may be any of the LED chips LM101A, LM101B, LH181B, LH231B from SAMSUNG.

Especially in the case of embodiment modular arrangements of optical cells 10 according to embodiments of the present invention which are formed into luminaires such as in the manner of the arrangement shown in FIGS. 1 & 2—which include a plurality of LEDs 32 finally mounted into a plurality of optical cells 10 which are themselves mounted in respective mounting apertures 22 in a configuring element 20—, such modular systems may have an advantage in that they may be readily designed so as to have a plurality of different optical cells or groups of optical cells combined into a single given array or arrangement, with each optical cell or optical cell group thereof performing a different optical function, such as collimation (i.e. operating as a spot light) or formation of a wide light cone (i.e. operating as a flood light), and these different functions may be switchable by turning on and off certain groups of LEDs on the board. Additionally, the overall outer shapes and sizes of the optical cells may be the same, despite individual optical cells having different optical functionalities. This is just one simple example of a multifunctional luminaire. This is just one simple example of a multifunctional luminaire. Other examples could perform other differing optical functions as between different optical cells or groups of optical cells, for example colour mixing functions or sequential or cycling operations. Thus, with appropriate design of the modular system luminaires may be designed and created with a wide range of optical functions and overall optical characteristics, thereby giving luminaire designers a wide range of options for how to configure many different luminaire products, which may for example be customized according to specific needs of an end customer.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Throughout the description and claims of this specification, features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

The invention claimed is:

1. An optical cell for forming a luminaire, the optical cell comprising:

(i) a light collector element, (ii) a cover element attached to the light collector element, and (iii) a transmission element mounted between the light collector element and the cover element;

wherein:

(iv) the light collector element comprises a body including:

an input for receiving and collecting light from at least one light source, an output for propagating collected light towards the transmission element, at least one wall defining one or more portions of the body between its input and output and configured for collecting light entering the body via its input and conveying or directing said light towards its output, and attachment means for mechanically attaching the body of the light collector element to the cover element and securing the transmission element between the light collector element and the cover element;

(v) the cover element comprises:

an input opening facing towards the transmission element and for receiving light transmitted by the transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening;

(vi) the transmission element comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element;

and wherein:

(vii) the transmission element comprises at least one optically active transmission optical element in the form of a generally flat or planar foil, film, sheet, web, plate, layer or other thin body of optical material exhibiting a desired optical function which effects or facilitates a desired distribution and/or one or more output characteristics of light emanating from the optical cell, by modifying or modulating one or more optical properties of the light emitted by the light source(s) as determined by the optical function of the optically active transmission element of the optical cell, wherein the transmission element comprises a said first surface, which is a first major face thereof, and a said second surface, which is a second major face thereof, and at least one of said first and second surfaces, or each of said first and second surfaces, comprises or is formed with optical functional nano-relief or micro-relief which displays either diffractive or refractive behaviour or a combination of diffractive and refractive behaviour.

2. An optical cell according to claim 1, wherein the light collector element actually has the said at least one light source mounted or positioned in or on or adjacent the input thereof.

3. An optical cell according to claim 1, wherein the optical cell further comprises at least one circuit board or wiring board, or a portion of a circuit board or wiring board, having the said at least one light source mounted, or pre-mounted, thereon.

4. An optical cell according to claim 1, wherein:

either (i) the or each optical cell comprises, or has mounted or positioned therein or thereon or thereadjacent, or is for having mounted or positioned therein or thereon or thereadjacent, a single LED or other light emitting device as the said at least one light source;

or (ii) the or each optical cell comprises, or has mounted or positioned therein or thereon or thereadjacent, or is for having mounted or positioned therein or thereon or thereadjacent, an array, cluster, series or group of a plurality of LEDs or other light emitting devices as the said at least one light source.

5. An optical cell according to claim 1, wherein one of the following (i) or (ii) is present or satisfied:

(i) the said at least one light source which is/are used to form the luminaire is/are mounted or arranged on at least one circuit board or wiring board, or at least one portion of a circuit board or wiring board, in substantially a single common plane, by virtue of being mounted on a single common planar circuit board or wiring board, or a single common planar portion of either thereof, or a plurality of individual circuit board or wiring board elements each lying in a common plane; or (ii) the said at least one light source which is/are used to form the luminaire is/are mounted or arranged either:

(ii)(a) on a single common circuit board or wiring board, or a single common portion of either thereof, which is shaped or configured in a substantially non-planar, or arcuate or otherwise curved in three dimensions, shape or configuration, or (ii)(b) on a plurality of individual circuit board or wiring board elements which are collectively arranged or configured relative to each other so as to form a substantially non-planar, or arcuate or otherwise curved in three dimensions, shaped or configured circuit board/wiring board arrangement.

6. An optical cell according to claim 1, wherein the light collector element of the or each optical cell takes the form of a hollow body, the hollow body comprising:

an input opening for receiving and collecting light from the at least one light source, an output opening for propagating collected light towards the transmission element, at least one internal wall defining a chamber within the light collector element between its input and output openings, the chamber wall(s) being configured for collecting light entering the chamber via the light collector element's input opening and conveying or directing or redirecting said light, or a portion of said light, towards its output opening, and attachment means for mechanically attaching the light collector element to the cover element and securing the transmission element between the light collector element and the cover element;

wherein the light collector element comprises a hollow body, housing, casing or container which comprises one or more internal walls defining and enclosing the said internal chamber therewithin, wherein the chamber is configured for containing, or having protruding thereinto, or for having mounted adjacent a lower opening or mouth thereof, the respective light source(s) when the components of the final luminaire are fully assembled.

7. An optical cell according to claim 6, wherein the internal wall(s) defining the chamber within the light collector element are configured such that the chamber has a three-dimensional shape which is:

(i) generally substantially conical, part-conical or frusto-conical, or (ii) generally substantially cylindrical, or (iii) generally substantially inverted-pyramidal, with any number of sides from 3 upwards, and in each case (i), (ii) or (iii) with the chamber's diameter/width increasing passing from the light collector element's input opening to its output opening.

8. An optical cell according to claim 1, wherein the light collector element of the optical cell takes the form of a substantially solid body of light-permeable or light-transparent or light-transmissible material, the body comprising:

an input surface for receiving and collecting light from the at least one light source, an output surface for propagating collected light towards the transmission element, at least one wall defining one or more portions of the body of the light collector element between its input and output surfaces, the at least one wall being configured for collecting light entering the body via the light collector element's input surface and redirecting and/or guiding said light, or a portion of said light, towards its output surface at least in part by means of TIR (total internal reflection) phenomena, and attachment means for mechanically attaching the light collector element to the cover element and securing the transmission element between the light collector element and the cover element.

9. An optical cell according to claim 1, wherein the light collector element includes support means for supporting the transmission element in the finally assembled optical cell, in order to assist in effecting a secure and stable supported mounting of the transmission element, relative to the light collector element and the cover element, in the finally assembled optical cell.

10. An optical cell according to claim 1, wherein the light collector element includes mounting means for mounting and/or aligning the light collector element on a circuit board or wiring board carrying the said at least one light source;

wherein one or more of the following (i), (ii) and (iii) is present or satisfied:

(i) the mounting means comprises one or more, or one or more pairs of, pins, spigots, ribs, protrusions, detents, clips, hooks, retaining members/elements, friction-fit or snap-fit elements, or solderable components, or other (inter-)engagement elements, provided on one of the light collector element and a portion of the circuit-or wiring board, and a corresponding or appropriate number of one or more holes, apertures, recesses, grooves, channels, or corresponding clip, hook, retainer, friction-fit, snap-fit elements, or solderable components, or other (inter-)engagement elements (for inter-engagement with the preceding defined (inter-)engagement element(s)) provided on the other of the light collector element and the portion of the circuit-or wiring board, whereby the light collector element can be united with the circuit-or wiring board;

(ii) the mounting means comprises a suitably sized, shaped and positioned land, seating element or portion, or mounting surface on at least one of, or both of, the light collector element and a portion of the circuit-or wiring board, via which the light collector element can be adhered to the circuit-or wiring board by use of an adhesive;

(iii) the mounting means comprises one or more sockets provided on one of the light collector element and a portion of the circuit-or wiring board into which can be plugged a corresponding pin, spigot, protrusion, or other pluggable securement element provided on the other of the light collector element and a portion of the circuit-or wiring board.

11. An optical cell according to claim 1, wherein the light collector element includes first attachment means, or a component of first attachment means, for mechanically and securely attaching the light collector element to the cover element of the optical cell, with the transmission element secured therebetween;

wherein the first attachment means comprise one or more, or one or more pairs of, snap-fit connection elements provided on the light collector element which is/are inter-engageable in a snap-fit manner with one or more corresponding snap-fit connection elements, or pairs of snap-fit connection elements, provided on the cover element.

12. An optical cell according to claim 1, wherein, in the cover element, for the purpose of the cover element's cavity's internal surface(s) being configured for allowing or effecting passage of light, or a portion of the light, through the cavity from the cover element's input opening towards its output opening, any one or more of the following optical effects (i), (ii), (iii) or (iv) is/are present:

(i) one or more internal surfaces, or one or more portions of one or more internal surfaces, of the cavity is/are configured for allowing passage or propagation of light, or any portion of the light, through the cavity from the cover element's input opening towards its output opening substantially unhindered, substantially without any interaction with or impingement or incidence on the or the respective cavity internal surface(s) or surface portion(s);

(ii) one or more internal surfaces, or one or more portions of one or more internal surfaces, of the cavity is/are configured so as to reflect or redirect or scatter light, or any portion of the light, that interacts therewith or impinges or is incident thereon, as it is conveyed or passes or travels through the cavity from the cover element's input opening towards its output opening;

(iii) one or more internal surfaces, or one or more portions of one or more internal surfaces, of the cavity is/are configured so as to substantially block or prevent or absorb the passage or travel of light, or any portion of the light, through the cavity from the cover element's input opening towards its output opening, where the said light is light (or a portion of it) that is so passing or travelling through the cavity at angles (relative to a central axis of the cover element) greater than or beyond one or more predetermined boundary angle(s);

(iv) any one or more of the effects (i), (ii) and/or (iii) above is/are present simultaneously, as or when effected by different or discrete portions of the one or more internal surfaces of the cavity or a part thereof.

13. An optical cell according to claim 1, wherein the cover element comprises a frame, casing, surround or body which comprises one or more internal surfaces which define and enclose the said internal cavity therewithin, wherein the said internal cavity is defined by the said internal surface(s) thereof which at least partially unite with or which are at least partially contiguous with or which are at least partially continuations of the wall(s) of the body, or at least an upper portion or upper peripheral region of the body, of the light collector element.

14. An optical cell according to claim 1, wherein the cover element includes one or more anti-glare features, wherein the or each anti-glare feature is constituted by one or more internal walls of the cover element having an extended height or upward length and being configured so as to have one or more internal walls or surfaces which are oriented at an angle, relative to a central or optical axis of the optical cell, of 20°, and in the range of from about 0 or 5 or 10 or 15 or 20 or 30° up to about 50 or 60 or 70 or 80°, whereby light rays emanating from the light source in that optical cell and being conveyed or directed by the light collector element through the transmission element and into the cavity within the cover element and towards the cover element's output opening, at an exit angle beyond a certain maximum angle value (as dependent on the actual aforementioned wall orientation angle and/or in conjunction with the height of the cover element's wall(s)) are blocked, cut out or at least partially absorbed by the cover element's wall material and thereby prevented from exiting the optical cell and causing unwanted glare.

15. An optical cell according to claim 1, wherein the light collector element of the or each optical cell takes the form of a hollow body, the hollow body comprising:

an input opening for receiving and collecting light from the at least one light source, an output opening for propagating collected light towards the transmission element, at least one internal wall defining a chamber within the light collector element between its input and output openings, the chamber wall(s) being configured for collecting light entering the chamber via the light collector element's input opening and conveying or directing or redirecting said light, or a portion of said light, towards its output opening, and attachment means for mechanically attaching the light collector element to the cover element and securing the transmission element between the light collector element and the cover element;

wherein the light collector element comprises a hollow body, housing, casing or container which comprises one or more internal walls defining and enclosing the said internal chamber therewithin, wherein the chamber is configured for containing, or having protruding thereinto, or for having mounted adjacent a lower opening or mouth thereof, the respective light source(s) when the components of the final luminaire are fully assembled;

and wherein the internal surface(s) defining the cavity within the cover element are configured such that the cavity has a three-dimensional shape which is:

(i) generally substantially part-conical or frusto-conical, or (ii) generally substantially cylindrical, or (iii) generally substantially inverted-pyramidal, with any number of sides from 3 upwards, and in each case (i), (ii) or (iii) with the cavity's diameter/width increasing passing from the cover element's input opening to its output opening.

16. An optical cell according to claim 1, wherein the transmission element is cut or shaped to include a suitable number of peripheral indents, notches, recesses, channels, or cut-outs, for the purpose of accommodating and allowing to extend therepast any elements or components of snap-fit-type attachment means that extend between the cover element and the light collector element for the purpose of attaching those two elements together, with the transmission element securely and stably trapped or clamped therebetween.

17. A luminaire comprising:

one or more optical cells according to claim 1;

a body or frame in which is/are contained the said one or more optical cells; and one or more light sources, the or each said light source being contained in a respective light collector element of a respective optical cell;

further comprising at least one circuit board or wiring board on which is/are mounted the said one or more light sources;

and further comprising a configuring element for accommodating the one or more optical cells in a predefined relative configuration or pattern in the luminaire, wherein the configuring element comprises a sheet or plate or film of material having one or more apertures therein in the said predefined relative configuration or pattern, each aperture being for receiving therein a respective one of the said optical cells.

18. An assembly for forming into a luminaire, which assembly is any one of the following (i), (ii) or (iii):

(i) an assembly comprising:

one or more optical cells according to claim 1; and a body or frame in which is/are contained the said one or more optical cells;

wherein each respective light collector element of a respective optical cell is for containing or having mounted therein or thereon or thereadjacent a respective one of the said at least one light source;

(ii) an assembly comprising:

one or more optical cells according to claim 1; and at least one light source, the or each said light source being mounted or positioned in or on or adjacent a respective light collector element of a respective optical cell, wherein the or each light source is mounted or pre-mounted on at least one circuit board or wiring board, or a portion of a circuit board or wiring board;

(iii) an assembly comprising:

a body or frame; and at least one light source mounted or positioned in the body or frame, the or each said light source being mounted or pre-mounted on at least one circuit board or wiring board or a portion of a circuit board or wiring board, wherein the or each light source is arranged and/or positioned and/or configured for having mounted or positioned thereon or thereover or thereadjacent a respective light collector element of a respective optical cell according to claim 1, once the or the respective optical cell has been mounted or positioned in the body or frame;

wherein any one of the said assemblies further comprises a configuring element for accommodating the one or more optical cells in a predefined relative configuration or pattern in the luminaire, wherein the configuring element comprises a sheet or plate or film of material having one or more apertures therein in the said predefined relative configuration or pattern, each aperture being for receiving therein a respective one of the said optical cells.

19. A method of production of a luminaire, the method comprising:

(i) forming one or more optical cells according to claim 1 by, for each optical cell:

(i)(a) providing a light collector element, a cover element for attachment to the light collector element, and a transmission element for mounting between the light collector element and the cover element;

wherein:

the light collector element comprises a body including:

an input for receiving and collecting light from at least one light source, an output for propagating collected light towards the transmission element, at least one wall defining one or more portions of the body between its input and output and configured for collecting light entering the body via its input and conveying or redirecting said light towards its output, and attachment means for mechanically attaching the light collector element to the cover element and securing the transmission element between the light collector element and the cover element;

the cover element comprises:

an input opening facing towards the transmission element and for receiving light transmitted by the transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and the transmission element comprises:

one or more planar optical elements, wherein the or each optical element includes a first surface facing towards the output of the light collector element and a second surface facing towards the input opening of the cover element, and the or each optical element exhibits a predetermined optical activity or function in its transmission of light incident thereon which has exited the output of the light collector element and is transmitted by the transmission element towards the input opening of the cover element, and wherein the transmission element comprises at least one optically active transmission optical element in the form of a generally flat or planar foil, film, sheet, web, plate, layer or other thin body of optical material exhibiting a desired optical function which effects or facilitates a desired distribution and/or one or more output characteristics of light emanating from the optical cell, by modifying or modulating one or more optical properties of the light emitted by the light source(s) as determined by the optical function of the optically active transmission element of the optical cell, wherein the transmission element comprises a said first surface, which is a first major face thereof, and a said second surface, which is a second major face thereof, and at least one of said first and second surfaces, or each of said first and second surfaces, comprises or is formed with optical functional nano-relief or micro-relief which displays either diffractive or refractive behaviour or a combination of diffractive and refractive behaviour; and (i)(b) attaching the cover element to the light collector element, with the transmission element mounted therebetween;

(ii) mounting or positioning at least one light source in or on or adjacent respective light collector element(s) of the respective optical cell(s); and, either before or after this step (ii), (iii) mounting or positioning the one or more optical cells in a body or frame of the luminaire;

wherein the step (ii) of mounting or positioning the at least one light source in or on or adjacent respective light collector element(s) of the respective optical cell(s) comprises either:

mounting or positioning in or on or adjacent respective light collector element(s) of the respective optical cell(s) a or a respective one of at least one circuit board or wiring board, or a portion of a circuit board or wiring board, on which has/have already been pre-mounted the said at least one light source; or mounting or positioning respective light collector element(s) of the respective optical cell(s) on or over or adjacent respective one(s) of the said at least one light source, or on or over or adjacent respective one(s) of the said at least one light source which has/have already been pre-mounted on the said circuit board or wiring board or portion of a circuit board or wiring board;

and further wherein the step (i) of forming the one or more cells additionally comprises, for each cell, additional steps (i)(c) and (i)(d), subsequent to step (i)(b), which comprise:

(i)(c) providing a configuring element for accommodating the one or more optical cells in a predefined relative configuration or pattern in the luminaire, wherein the configuring element comprises a sheet or plate or film of material having one or more apertures therein in a predefined relative configuration or pattern, each aperture being for receiving therein a respective one of the said optical cells; and (i)(d) inserting the respective optical cell into a respective aperture in the configuring element.

20. A luminaire according to claim 17, wherein the said at least one circuit board or wiring board and the said configuring element are present in the luminaire, and the luminaire further includes means for forming or creating one or more air gaps or spaces, or series of air gaps or spaces, between the components of any one or more of the following pairs of components of the luminaire:

(i) an input side of the or each optical cell and the configuring element; or (ii) an input side of the or each optical cell and the circuit board or wiring board carrying the respective light source associated with that respective optical cell; or (iii) an input side of the or each optical cell and the respective light source associated with that respective optical cell; or (iv) one or more side walls of the or each optical cell and the respective light source associated with that respective optical cell; or (v) the configuring element and the circuit board or wiring board carrying the respective light source associated with that respective optical cell.

21. An optical cell according to claim 6, wherein the light collector element comprises at least one reflecting and/or collimating element or feature for reflecting and/or collimating light entering the chamber therewithin from the light source associated with that optical cell and directing or redirecting that light towards the chamber's output opening and thus towards the transmission element, and optionally further onwards towards the cover element of that optical cell, wherein the at least one reflecting and/or collimating element or feature comprise(s) one or more internal light-reflecting walls or surfaces, and/or one or more internal walls or surfaces that function to collimate light passing through the light collector element.

22. A kit of parts for use in forming one or more optical cells for use in forming a luminaire, the kit comprising:

(i) at least one light collector element, (ii) at least one cover element for attachment to the or a respective light collector element, and (iii) at least one transmission element for mounting between the or the respective light collector element and cover element;

wherein:

(iv) the or each respective light collector element comprises a body including:

an input for receiving and collecting light from at least one light source, an output for propagating collected light towards the or the respective transmission element, at least one wall defining one or more portions of the body between its input and output and configured for collecting light entering the body via its input and conveying or directing said light towards its output, and attachment means for mechanically attaching the or the respective light collector element to the or the respective cover element and securing the or the respective transmission element between the or the respective light collector element and cover element;

(v) the or each respective cover element comprises:

an input opening facing towards the or the respective transmission element and for receiving light transmitted by the or the respective transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and (vi) the or each respective transmission element comprises:

one or more planar optical elements, wherein the or each optical element includes a first surface facing towards the output of the or the respective light collector element and a second surface facing towards the input opening of the or the respective cover element, and the or each optical element exhibits a predetermined optical activity or function in its transmission of light incident thereon which has exited the output of the or the respective light collector element and is transmitted by the transmission element towards the input opening of the or the respective cover element, and wherein the transmission element comprises at least one optically active transmission optical element in the form of a generally flat or planar foil, film, sheet, web, plate, layer or other thin body of optical material exhibiting a desired optical function which effects or facilitates a desired distribution and/or one or more output characteristics of light emanating from the optical cell, by modifying or modulating one or more optical properties of the light emitted by the light source(s) as determined by the optical function of the optically active transmission element of the optical cell, wherein the transmission element comprises a said first surface, which is a first major face thereof, and a said second surface, which is a second major face thereof, and at least one of said first and second surfaces, or each of said first and second surfaces, comprises or is formed with optical functional nano-relief or micro-relief which displays either diffractive or refractive behaviour or a combination of diffractive and refractive behaviour.

23. A kit of parts for use in forming a luminaire, the kit comprising:

one or more, or any plurality of, optical cells each including:

(i) at least one light collector element, (ii) at least one cover element for attachment to the or a respective light collector element, and (iii) at least one transmission element for mounting between the or the respective light collector element and cover element;

wherein:

(iv) the or each respective light collector element comprises:

an input for receiving and collecting light from at least one light source, an output for propagating collected light towards the or the respective transmission element, at least one wall defining one or more portions of the body between its input and output and configured for collecting light entering the body via its input and conveying or directing said light towards its output, and attachment means for mechanically attaching the light collector element to the or the respective cover element and securing the or the respective transmission element between the or the respective light collector element and cover element;

(v) the or each respective cover element comprises:

an input opening facing towards the or the respective transmission element and for receiving light transmitted by the or the respective transmission element, an output opening via which light is outputted from the optical cell, and at least one internal surface defining a cavity within the cover element between its input and output openings, the cavity's internal surface(s) being configured for allowing or effecting passage of light, or a portion of the light, through the cavity from the cover element's input opening towards its output opening; and (vi) the or each respective transmission element comprises:

one or more planar optical elements, wherein the or each optical element includes a first surface facing towards the output of the or the respective light collector element and a second surface facing towards the input opening of the or the respective cover element, and the or each optical element exhibits a predetermined optical activity or function in its transmission of light incident thereon which has exited the output of the or the respective light collector element and is transmitted by the transmission element towards the input opening of the or the respective cover element, and wherein the transmission element comprises at least one optically active transmission optical element in the form of a generally flat or planar foil, film, sheet, web, plate, layer or other thin body of optical material exhibiting a desired optical function which effects or facilitates a desired distribution and/or one or more output characteristics of light emanating from the optical cell, by modifying or modulating one or more optical properties of the light emitted by the light source(s) as determined by the optical function of the optically active transmission element of the optical cell, wherein the transmission element comprises a said first surface, which is a first major face thereof, and a said second surface, which is a second major face thereof, and at least one of said first and second surfaces, or each of said first and second surfaces, comprises or is formed with optical functional nano-relief or micro-relief which displays either diffractive or refractive behaviour or a combination of diffractive and refractive behaviour;

optionally together with one or more of the following:

a body or frame for containing the said optical cell(s) and any other components of the luminaire; or at least one, or a plurality of, said light source(s) for mounting or positioning in or on or adjacent the or each respective said light collector element of the or each respective optical cell; or a configuring element for accommodating the one or more optical cells in a predefined relative configuration or pattern in the luminaire, wherein the configuring element comprises a sheet or plate or film of material having one or more apertures therein in the said predefined relative configuration or pattern, each aperture being for receiving therein a respective one of the said optical cells.

* * * * *